(12) United States Patent
Saito et al.

(10) Patent No.: US 11,336,382 B2
(45) Date of Patent: May 17, 2022

(54) TERMINAL, RADIO COMMUNICATION SYSTEM, AND RADIO COMMUNICATION METHOD TO REDUCE AN INCREASE IN SIGNALING OVERHEAD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/647,417

(22) PCT Filed: Sep. 14, 2017

(86) PCT No.: PCT/JP2017/033359
§ 371 (c)(1),
(2) Date: Mar. 13, 2020

(87) PCT Pub. No.: WO2019/053863
PCT Pub. Date: Mar. 21, 2019

(65) Prior Publication Data
US 2020/0259576 A1 Aug. 13, 2020

(51) Int. Cl.
*H04J 1/02* (2006.01)
(52) U.S. Cl.
CPC ..................... *H04J 1/02* (2013.01)
(58) Field of Classification Search
CPC ...... H04J 1/02; H04J 1/00; H04B 7/06; H04L 5/0016; H04L 5/0094; H04L 5/0051; H04L 27/2613
See application file for complete search history.

(56) References Cited

U.S. PATENT DOCUMENTS

| | | | |
|---|---|---|---|
| 10,447,319 B1* | 10/2019 | Lee | H04B 7/0473 |
| 2011/0051824 A1* | 3/2011 | Kim | H04L 1/1861 |
| | | | 375/259 |
| 2011/0170631 A1* | 7/2011 | Kim | H04L 5/0023 |
| | | | 375/296 |
| 2012/0300670 A1 | 11/2012 | Sun et al. | |
| 2013/0142125 A1* | 6/2013 | Shimezawa | H04B 7/063 |
| | | | 370/328 |

(Continued)

FOREIGN PATENT DOCUMENTS

EP    2639994 A2    9/2013

OTHER PUBLICATIONS

Kim et al. "Method for DMRS to Data Power Ratio Determination" English Translation of U.S. Appl. No. 62/542,782, filed Jun. 2017 (Year: 2017).*

(Continued)

*Primary Examiner* — Hoang-Chuong Q Vu
(74) *Attorney, Agent, or Firm* — Osha Bergman Watanabe & Burton LLP

(57) ABSTRACT

A terminal is disclosed including a receiver that receives a demodulation reference signal; and a processor that controls reception of the demodulation reference signal based on a parameter related to mapping of the demodulation reference signal, wherein when the parameter is configured to a specific value, a specific multiplexing method for the demodulation reference signal is supported. In other aspects, another terminal is also disclosed.

7 Claims, 20 Drawing Sheets

(56) References Cited

U.S. PATENT DOCUMENTS

| | | | | |
|---|---|---|---|---|
| 2013/0230017 | A1* | 9/2013 | Papasakellariou | H04L 1/1861 370/330 |
| 2016/0134401 | A1* | 5/2016 | Pajukoski | H04J 11/005 370/329 |
| 2016/0301515 | A1* | 10/2016 | Ouchi | H04L 5/0057 |
| 2017/0353947 | A1* | 12/2017 | Ang | H04L 5/0048 |
| 2017/0366380 | A1* | 12/2017 | Hwang | H04L 5/0055 |
| 2018/0097598 | A1* | 4/2018 | Ang | H04L 5/0048 |
| 2018/0205511 | A1* | 7/2018 | Li | H04L 1/1812 |
| 2018/0227838 | A1* | 8/2018 | Hayashi | H04W 72/042 |
| 2018/0227907 | A1* | 8/2018 | Hosseini | H04L 5/0048 |
| 2018/0295609 | A1* | 10/2018 | Shimezawa | H04W 72/04 |
| 2019/0037586 | A1* | 1/2019 | Park | H04L 1/0031 |
| 2019/0053316 | A1* | 2/2019 | Aiba | H04W 76/27 |
| 2019/0089564 | A1* | 3/2019 | Blasco Serrano | H04L 27/2608 |
| 2019/0104006 | A1* | 4/2019 | Wang | H04L 5/005 |
| 2019/0223176 | A1* | 7/2019 | Liu | H04W 72/04 |
| 2019/0239253 | A1* | 8/2019 | Tomeba | H04L 5/00 |
| 2019/0253300 | A1* | 8/2019 | Munier | H04L 5/0051 |
| 2020/0028647 | A1* | 1/2020 | Kim | H04L 5/0051 |
| 2020/0177358 | A1* | 6/2020 | Liu | H04L 5/0007 |
| 2020/0178287 | A1* | 6/2020 | Kim | H04L 5/001 |
| 2020/0213049 | A1* | 7/2020 | Kim | H04L 5/0023 |
| 2021/0014034 | A1* | 1/2021 | Horiuchi | H04W 52/325 |
| 2021/0281374 | A1* | 9/2021 | Kim | H04L 1/00 |

OTHER PUBLICATIONS

Kim et al. "Method For DMRS to Data Power Ratio Determination " English Translation of U.S. Appl. No. 62/544,009, filed Jun. 2017 (Year: 2017).*

International Search Report issued in PCT/JP2017/033359 dated Nov. 28, 2017 (7 pages).
Written Opinion of the International Searching Authority issued in PCT/JP2017/033359 dated Nov. 28, 2017 (7 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
3GPP TSG RAN WG1 NR Ad-hoc #3; R1-1716509 "On remaining issues of DM-RS for NR physical data channels" Nokia, Nokia Shanghai Bell; Nagoya, Japan; Sep. 18-21, 2017 (11 pages).
Extended European Search Report issued in European Application No. 17925244.0, dated Mar. 12, 2021 (9 pages).
Notice of Reasons for Refusal issued in Japanese Application No. 2019-541584 dated Sep. 14, 2021 (3 pages).
Examination Report issued in Indian Application No. 20237016021 dated Aug. 27, 2021 (8 pages).
Huawei, "Discussion on DM-RS Overhead Reduction" 3GPP TSG RAN WG1 Meeting #90, R1-1712092, Prague, Czech Republic, Aug. 21-25, 2017 (5 pages).
Nokia, "DL DM-RS patterns link level simulation" 3GPP TSG RAN WG1 #90, R1-1714256, Prague, Czech Republic, Aug. 21-25, 2017 (8 pages).
Office Action issued in the counterpart Japanese Patent Application No. 2019-541584, dated Mar. 22, 2022 (6 pages).
NEC; "Discussion on DMRS configurations"; 3GPP TSG RAN WG1 Meeting AH_NR#3, R1-1715709; Nagoya, Japan; Sep. 18-21, 2017 (4 pages).
Panasonic et al.; "WF on DMRS port mapping table"; 3GPP TSG RAN WG1 Meeting RAN1 #90, R1-1715231; Prague, Czech Republic; Aug. 21-25, 2017 (7 pages).

* cited by examiner

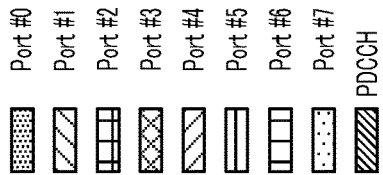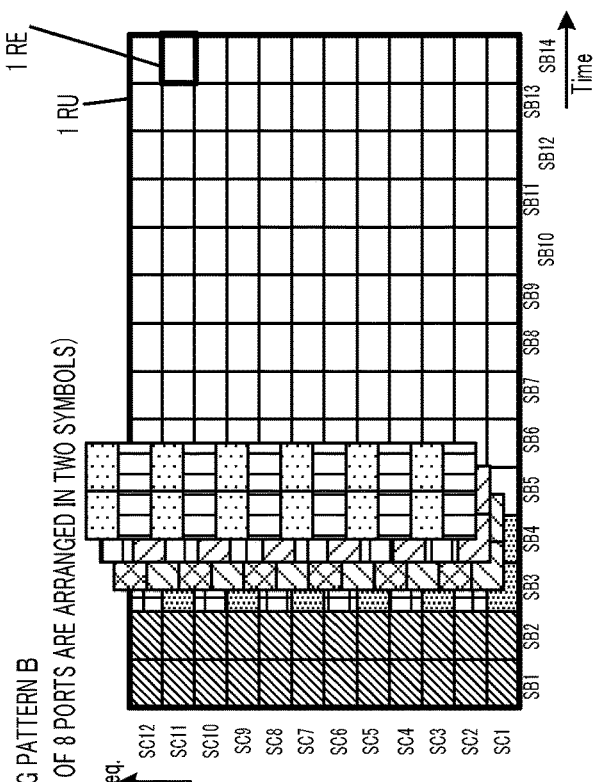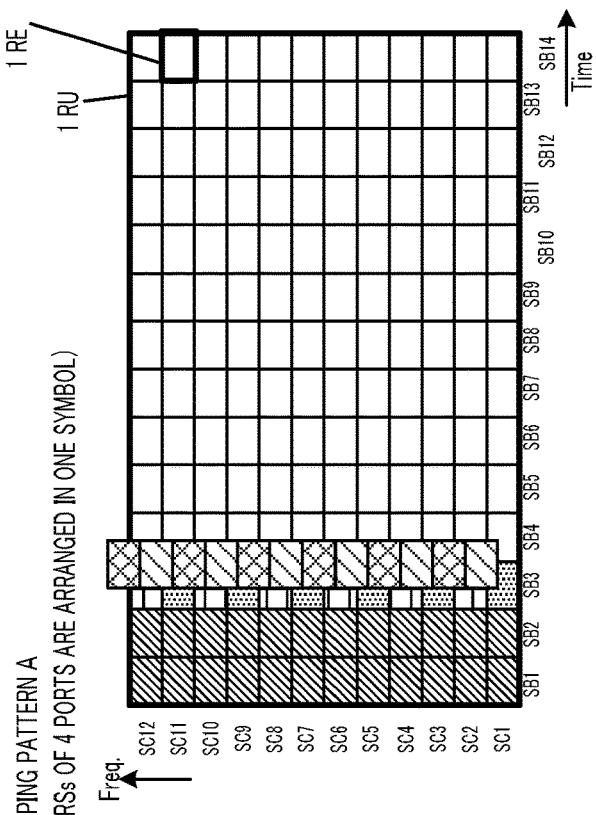
FIG. 3

 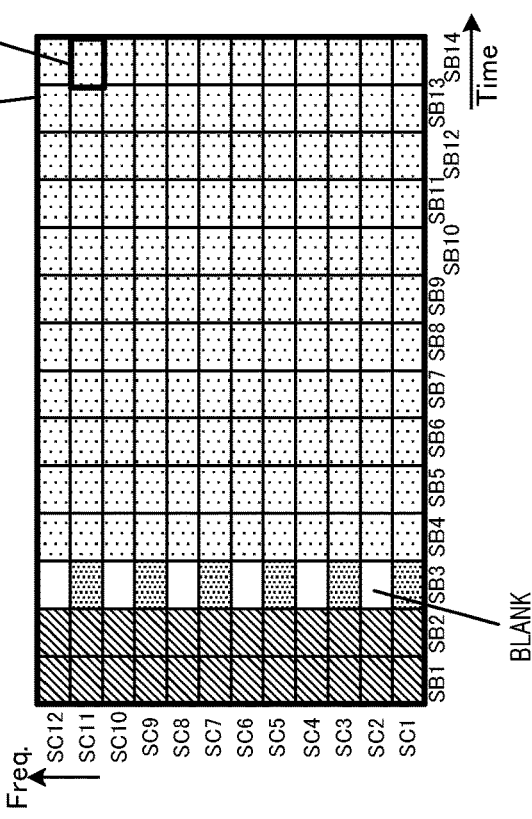 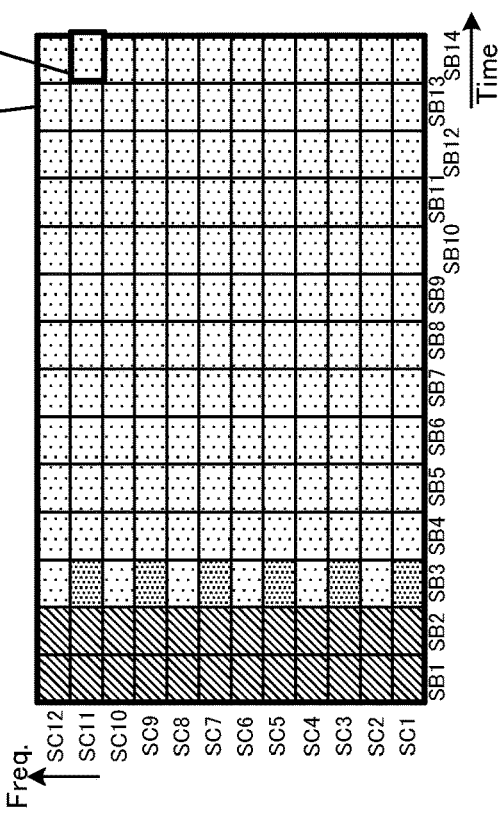
FIG. 5

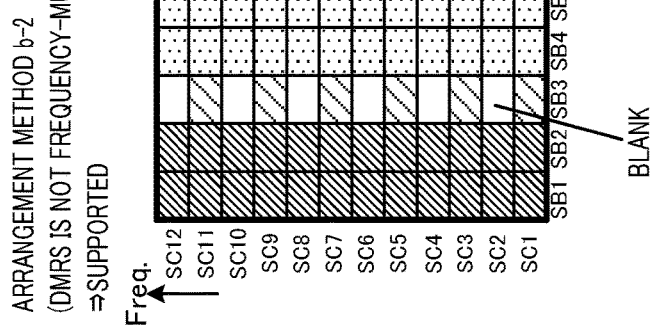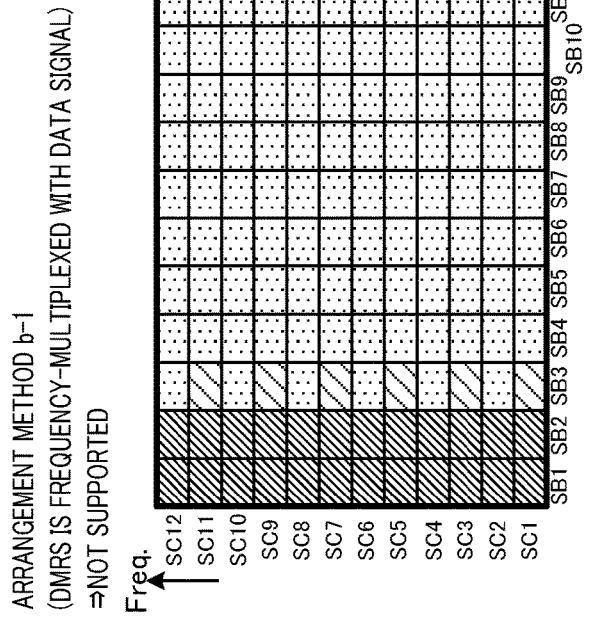
FIG. 6

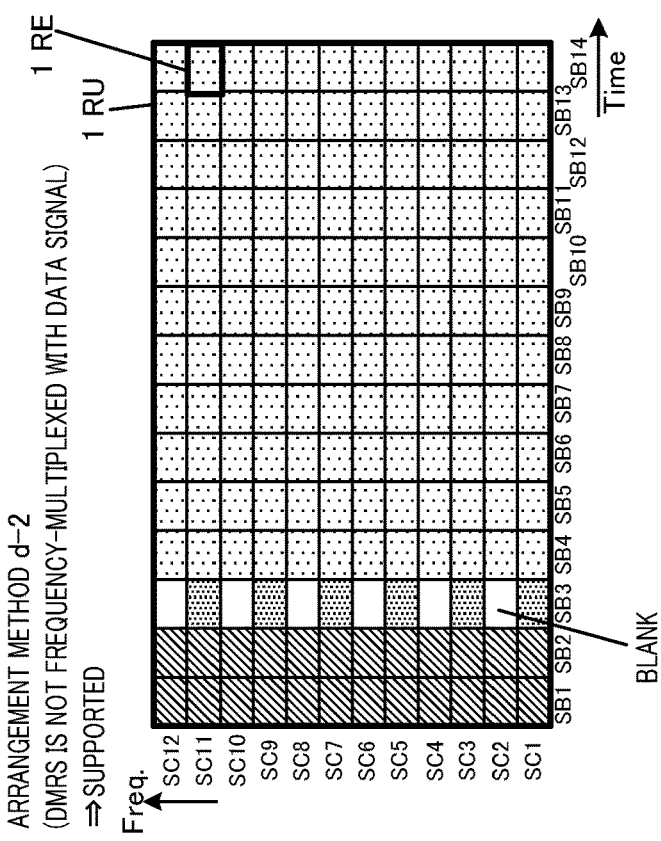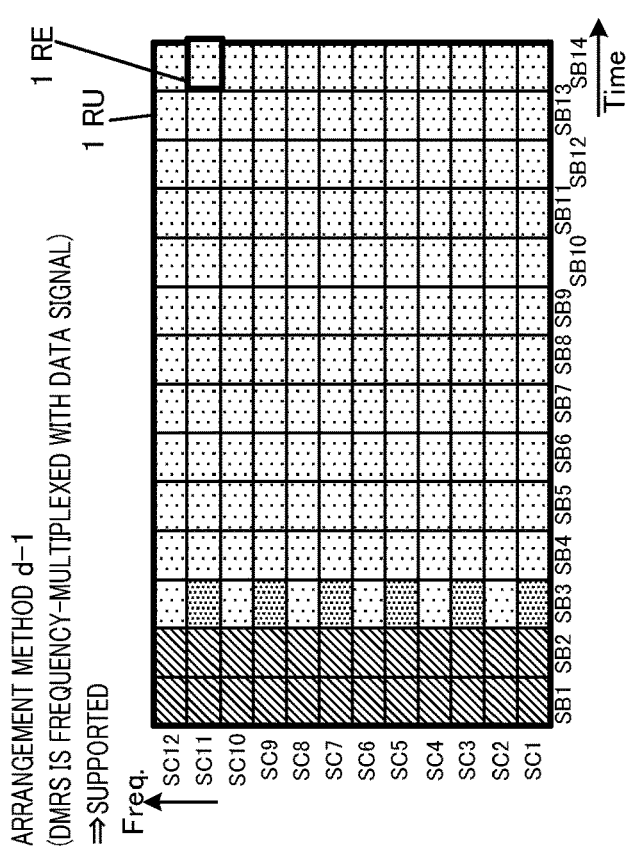
FIG. 8

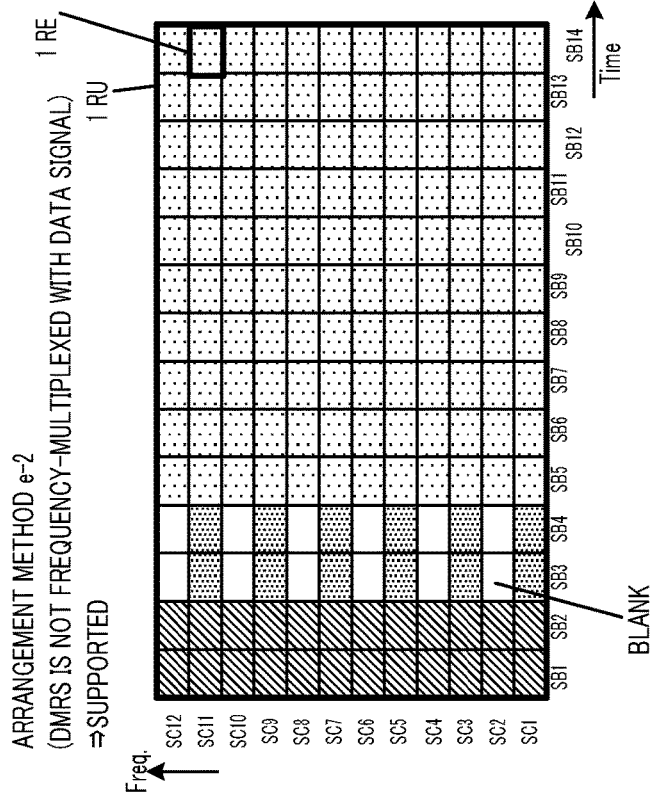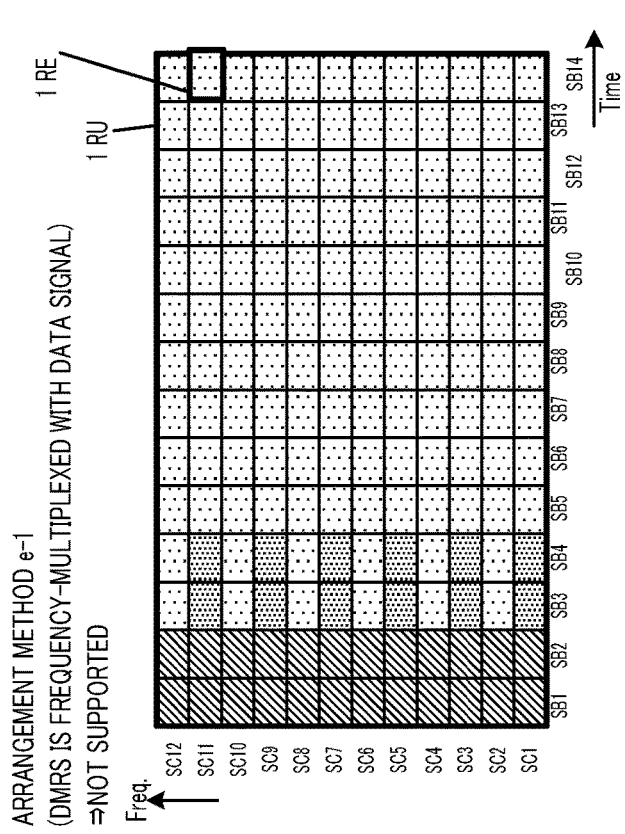
FIG. 9

CDM IN FREQUENCY DIRECTION (Port #0 AND Port #1)
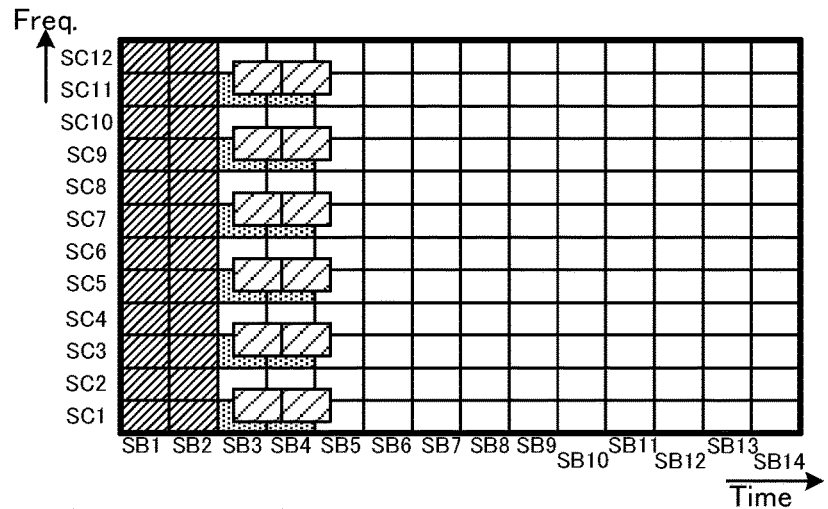
FDM (Port #0 AND Port #2)
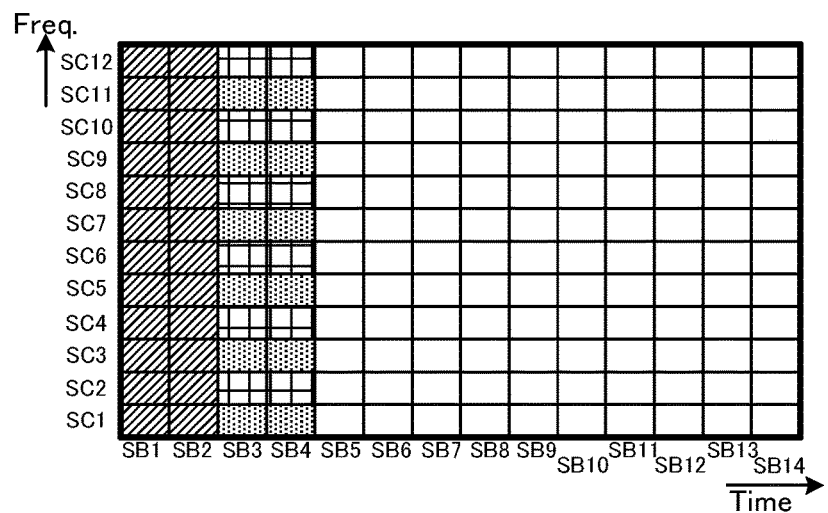
CDM IN TIME DIRECTION (Port #0 AND Port #4)
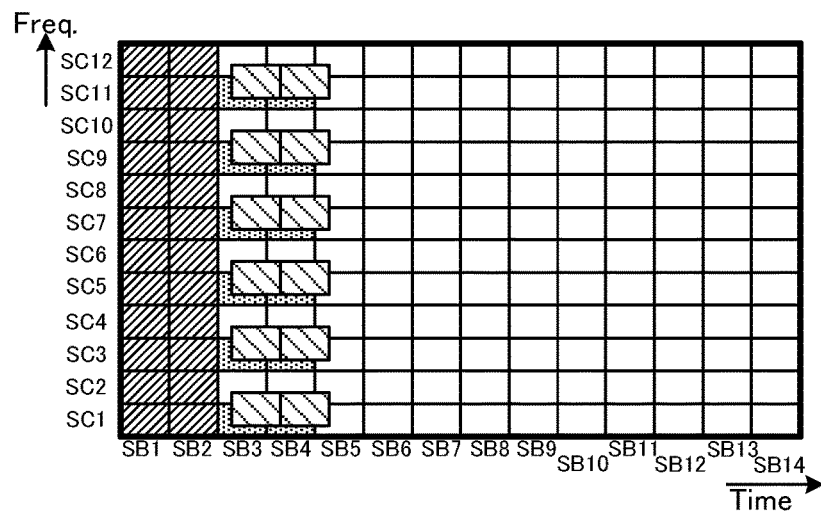
FIG. 11

| Index | NUMBER OF PORTS | PORT NUMBER | NUMBER OF SYMBOLS | SCRAMBLING ID | POSSIBILITY OR NOT OF FDM |
|---|---|---|---|---|---|
| 0 | 1 | 0 | 1 | 0 | enable |
| 1 | 1 | 0 | 1 | 0 | disable |
| a | 1 | 1 | 1 | 0 | enable |
| 2 | 1 | 1 | 1 | 0 | disable |
| b | 1 | 2 | 1 | 0 | enable |
| 3 | 1 | 2 | 1 | 0 | disable |
| c | 1 | 3 | 1 | 0 | enable |
| 4 | 1 | 3 | 1 | 0 | disable |
| 5 | 2 | 0, 1 | 1 | 0 | enable |
| 6 | 2 | 0, 1 | 1 | 0 | disable |
| d | 2 | 0, 2 | 1 | 0 | disable |
| e | 2 | 2, 3 | 1 | 0 | enable |
| 7 | 2 | 2, 3 | 1 | 0 | disable |
| 8 | 3 | 0-2 | 1 | 0 | – |
| 9 | 4 | 0-3 | 1 | 0 | – |
| f | 1 | 0 | 1 | 1 | enable |
| 10 | 1 | 0 | 1 | 1 | disable |
| 11 | 1 | 1 | 1 | 1 | disable |
| 12 | 1 | 2 | 1 | 1 | disable |
| 13 | 1 | 3 | 1 | 1 | disable |
| 14 | 2 | 0, 1 | 1 | 1 | disable |
| 15 | 2 | 2, 3 | 1 | 1 | disable |
| g | 1 | 0 | 2 | 0 | enable |
| 16 | 1 | 0 | 2 | 0 | disable |
| 17 | 1 | 1 | 2 | 0 | disable |
| 18 | 1 | 2 | 2 | 0 | disable |
| 19 | 1 | 3 | 2 | 0 | disable |
| 20 | 1 | 4 | 2 | 0 | disable |
| 21 | 1 | 5 | 2 | 0 | disable |
| 22 | 1 | 6 | 2 | 0 | disable |
| 23 | 1 | 7 | 2 | 0 | disable |
| 24 | 2 | 0, 1 | 2 | 0 | disable |
| h | 2 | 0, 2 | 2 | 0 | disable |
| i | 2 | 0, 4 | 2 | 0 | disable |
| 25 | 2 | 2, 3 | 2 | 0 | disable |
| 26 | 2 | 4, 5 | 2 | 0 | disable |
| 27 | 2 | 6, 7 | 2 | 0 | disable |

FIG. 13A

| Index | NUMBER OF PORTS | PORT NUMBER | NUMBER OF SYMBOLS | SCRAMBLING ID | POSSIBILITY OR NOT OF FDM |
|---|---|---|---|---|---|
| 28 | 3 | 0, 1, 4 (TD-OCC on)<br>0-2 (TD-OCC off) | 2 | 0 | disable |
| j | 3 | 0, 1, 4 | 2 | 0 | disable |
| k | 3 | 0-2 | 2 | 0 | disable |
| 29 | 3 | 2, 3, 6 (TD-OCC on)<br>Reserved(TD-OCC off) | 2 | 0 | disable |
| 30 | 4 | 0,1,4,5(TD-OCC on)<br>0-3(TD-OCC off) | 2 | 0 | disable |
| 31 | 4 | 2,3,6,7(TD-OCC on)<br>Reserved(TD-OCC off) | 2 | 0 | disable |

FIG. 13B

| Index | NUMBER OF PORTS | PORT NUMBER | NUMBER OF SYMBOLS | SCRAMBLING ID | POSSIBILITY OR NOT OF FDM |
|---|---|---|---|---|---|
| 0 | 5 | 0-4 | 2 | 0 | – |
| 1 | 6 | 0-5 | 2 | 0 | – |
| 2 | 7 | 0-6 | 2 | 0 | – |
| 3 | 8 | 0-7 | 2 | 0 | – |
| 4-31 | Reserved | | | | |

FIG. 14

| Index | NUMBER OF PORTS | PORT NUMBER | NUMBER OF SYMBOLS | SCRAMBLING ID | POSSIBILITY OR NOT OF FDM |
|---|---|---|---|---|---|
| 0 | 1 | 0 | 1 | 0 | enable |
| 1 | 1 | 0 | 1 | 0 | disable |
| a | 1 | 1 | 1 | 0 | enable |
| 2 | 1 | 1 | 1 | 0 | disable |
| b | 1 | 2 | 1 | 0 | enable |
| 3 | 1 | 2 | 1 | 0 | disable |
| c | 1 | 3 | 1 | 0 | enable |
| 4 | 1 | 3 | 1 | 0 | disable |
| d | 1 | 4 | 1 | 0 | enable |
| 5 | 1 | 4 | 1 | 0 | disable |
| e | 1 | 5 | 1 | 0 | enable |
| 6 | 1 | 5 | 1 | 0 | disable |
| 7 | 2 | 0, 1 | 1 | 0 | enable |
| 8 | 2 | 0, 1 | 1 | 0 | disable |
| f | 2 | 0, 2 | 1 | 0 | disable |
| 9 | 2 | 2, 3 | 1 | 0 | disable |
| 10 | 2 | 4, 5 | 1 | 0 | disable |
| 11 | 3 | 0-2 | 1 | 0 | disable |
| 12 | 4 | 0-3 | 1 | 0 | disable |
| g | 1 | 0 | 1 | 1 | enable |
| 13 | 1 | 0 | 1 | 1 | disable |
| 14 | 1 | 1 | 1 | 1 | disable |
| 15 | 1 | 2 | 1 | 1 | disable |
| 16 | 1 | 3 | 1 | 1 | disable |
| 17 | 1 | 4 | 1 | 1 | disable |
| 18 | 1 | 5 | 1 | 1 | disable |
| 19 | 2 | 0, 1 | 1 | 1 | disable |
| 20 | 2 | 2, 3 | 1 | 1 | disable |
| 21 | 2 | 4, 5 | 1 | 1 | disable |
| h | 1 | 0 | 2 | 0 | enable |
| 22 | 1 | 0 | 2 | 0 | disable |
| 23 | 1 | 1 | 2 | 0 | disable |
| 24 | 1 | 2 | 2 | 0 | disable |
| 25 | 1 | 3 | 2 | 0 | disable |
| 26 | 1 | 4 | 2 | 0 | disable |
| 27 | 1 | 5 | 2 | 0 | disable |
| 28 | 1 | 6 | 2 | 0 | disable |
| 29 | 1 | 7 | 2 | 0 | disable |
| 30 | 1 | 8 | 2 | 0 | disable |
| 31 | 1 | 9 | 2 | 0 | disable |
| 32 | 1 | 10 | 2 | 0 | disable |
| 33 | 1 | 11 | 2 | 0 | disable |

FIG. 15A

| Index | NUMBER OF PORTS | PORT NUMBER | NUMBER OF SYMBOLS | SCRAMBLING ID | POSSIBILITY OR NOT OF FDM |
|---|---|---|---|---|---|
| 34 | 2 | 0, 1 | 2 | 0 | disable |
| i | 2 | 0, 2 | 2 | 0 | disable |
| j | 2 | 0, 6 | 2 | 0 | disable |
| 35 | 2 | 2, 3 | 2 | 0 | disable |
| 36 | 2 | 4, 5 | 2 | 0 | disable |
| 37 | 2 | 6, 7 | 2 | 0 | disable |
| 38 | 2 | 8, 9 | 2 | 0 | disable |
| 39 | 2 | 10, 11 | 2 | 0 | disable |
| 40 | 3 | 0, 1, 6 (TD-OCC on) <br> 0-2 (TD-OCC off) | 2 | 0 | disable |
| k | 3 | 0, 1, 6 | 2 | 0 | disable |
| l | 3 | 0-2 | 2 | 0 | disable |
| 41 | 3 | 2, 3, 8 (TD-OCC on) <br> Reserved(TD-OCC off) | 2 | 0 | disable |
| 42 | 3 | 4,5,10(TD-OCC on) <br> 0-3(TD-OCC off) | 2 | 0 | disable |
| 43 | 4 | 0,1,6,7(TD-OCC on) <br> Reserved(TD-OCC off) | 2 | 0 | disable |
| 44 | 4 | 2,3,8,9(TD-OCC on) <br> Reserved(TD-OCC off) | 2 | 0 | disable |
| 45 | 4 | 4,5,10,11(TD-OCC on) <br> Reserved(TD-OCC off) | 2 | 0 | disable |
| 46 ⋮ 63 | | Reserved | | | |

FIG. 15B

| Index | NUMBER OF PORTS | PORT NUMBER | NUMBER OF SYMBOLS | SCRAMBLING ID | POSSIBILITY OR NOT OF FDM |
|---|---|---|---|---|---|
| 0 | 5 | 0-4 | 1 | 0 | - |
| 1 | 5 | 0,1,2,3,6 (TD-OCC on)<br>0-4 (TD-OCC off) | 2 | 0 | - |
| m | 5 | 0,1,2,3,6 | 2 | 0 | - |
| n | 5 | 0-4 | 2 | 0 | - |
| 2 | 6 | 0-5 | 2 | 0 | - |
| 3 | 6 | 0,1,2,3,6,7 (TD-OCC on)<br>0-5 (TD-OCC off) | 2 | 0 | - |
| 4 | 7 | 0-3,6-8 (TD-OCC on)<br>reserved (TD-OCC off) | 2 | 0 | - |
| 5 | 8 | 0-3,6-9 (TD-OCC on)<br>reserved (TD-OCC off) | 2 | 0 | - |
| 6<br>⋮<br>63 | Reserved | | | | |

FIG. 16

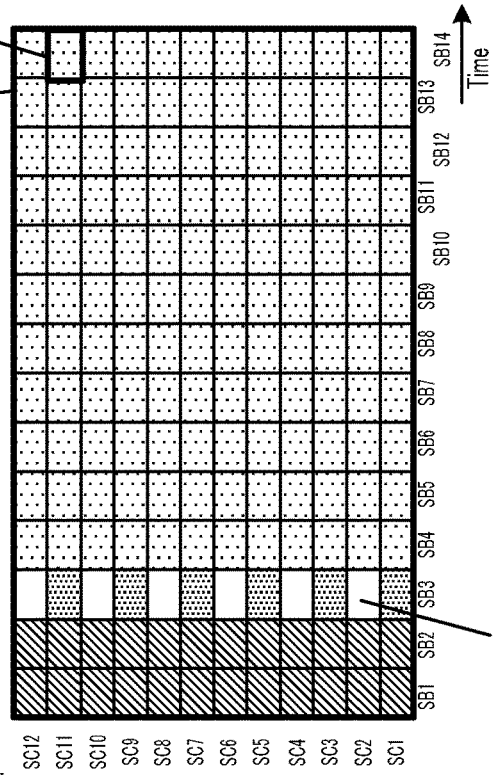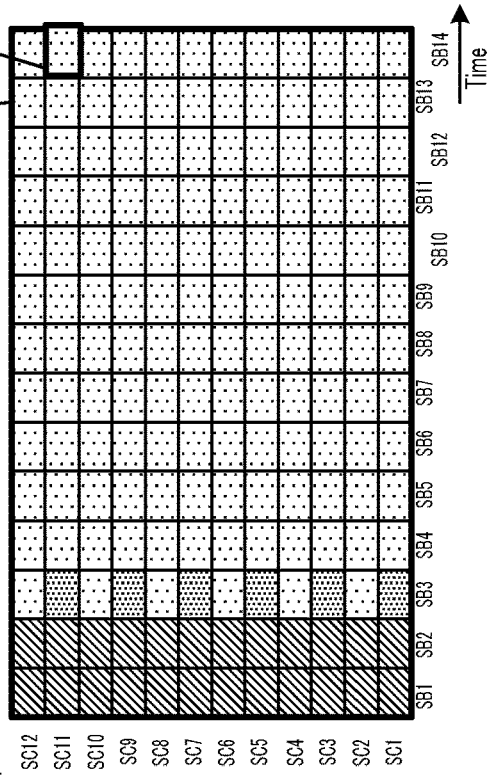
FIG. 17

TERMINAL, RADIO COMMUNICATION SYSTEM, AND RADIO COMMUNICATION METHOD TO REDUCE AN INCREASE IN SIGNALING OVERHEAD

TECHNICAL FIELD

The present invention relates to a user terminal and a radio communication method.

BACKGROUND ART

Long Term Evolution (LTE) has been specified for achieving a higher data rate, lower latency, and/or the like in a Universal Mobile Telecommunication System (UMTS) network (see Non-Patent Literature (hereinafter referred to as "NPL") 1). Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT)), and the like.

The future radio communication systems (for example, 5G) are expected to support a broad range of frequencies ranging from a low carrier frequency to a high carrier frequency. The future radio communication systems are desired to flexibly support arrangement (mapping) of reference signals or the like since propagation path environments and/or requirements greatly differ from one frequency range to another (such as a low carrier frequency and high carrier frequency), for example.

For example, in the future radio communication systems, a reference signal (e.g., demodulation reference signal) of a port (layer) assigned to a user terminal is assumed to be arranged on radio resources based on various methods and transmitted to the user terminal. In that case, for example, a radio base station notifies a user terminal of the information related to the port assigned to the user terminal and the information on an arrangement method for the reference signal.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

However, an attempt to cover all reference-signal arrangement methods in notification of information related to a port assigned to a user terminal causes an increase in signaling overhead.

The present invention is made in view of this point, and one object of the present invention is to provide a user terminal and a radio communication method which make it possible to notify information related to a port assigned to the user terminal and information related to a reference-signal arrangement method while reducing an increase in signaling overhead.

Solution to Problem

A user terminal according to one aspect of the present invention includes: a receiver that receives control information indicating one of possible combination patterns of a plurality of parameters related to arrangement of a demodulation reference signal on a radio resource; and a controller that controls reception processing of a downlink signal transmitted by a radio base station, the controller controlling the reception processing based on information indicating that frequency multiplexing between a data signal and the demodulation reference signal is accepted and based on the control information, the information indicating the acceptance of the frequency multiplexing by a combination pattern of the possible combination patterns which includes at least one of the plurality of parameters configured to a specific value.

Advantageous Effects of Invention

According to one aspect of the present invention, it is possible to notify information related to a port assigned to a user terminal and information related to a reference-signal arrangement method while reducing an increase in signaling overhead.

BRIEF DESCRIPTION OF DRAWINGS

FIG. 3 illustrates first mapping pattern examples in one embodiment of the present invention;

FIG. 5 illustrates first examples of an arrangement method in one embodiment of the present invention;

FIG. 6 illustrates second examples of an arrangement method in one embodiment of the present invention;

FIG. 8 illustrates fourth examples of an arrangement method in one embodiment of the present invention;

FIG. 9 illustrates fifth examples of an arrangement method in one embodiment of the present invention;

FIG. 11 illustrates second examples of an arrangement method in which DMRSs of two ports are multiplexed in one embodiment of the present invention;

FIG. 13A illustrates a first example of a table of indices related to DMRS configuration information pieces in one embodiment of the present invention;

FIG. 13B illustrates the first example of the table of the indices related to the DMRS configuration information pieces in one embodiment of the present invention;

FIG. 14 illustrates a second example of a table of indices related to DMRS configuration information pieces in one embodiment of the present invention;

FIG. 15A illustrates a third example of a table of indices related to DMRS configuration information pieces in one embodiment of the present invention;

FIG. 15B illustrates the third example of the table of the indices related to the DMRS configuration information pieces in one embodiment of the present invention;

FIG. 16 illustrates a fourth example of a table of indices related to DMRS configuration information pieces in one embodiment of the present invention;

FIG. 17 illustrates sixth examples of an arrangement method in one embodiment of the present invention;

DESCRIPTION OF EMBODIMENTS

Hereinafter, one embodiment of the present invention will be described in detail with reference to the accompanying drawings.

One Embodiment

Figure 1:
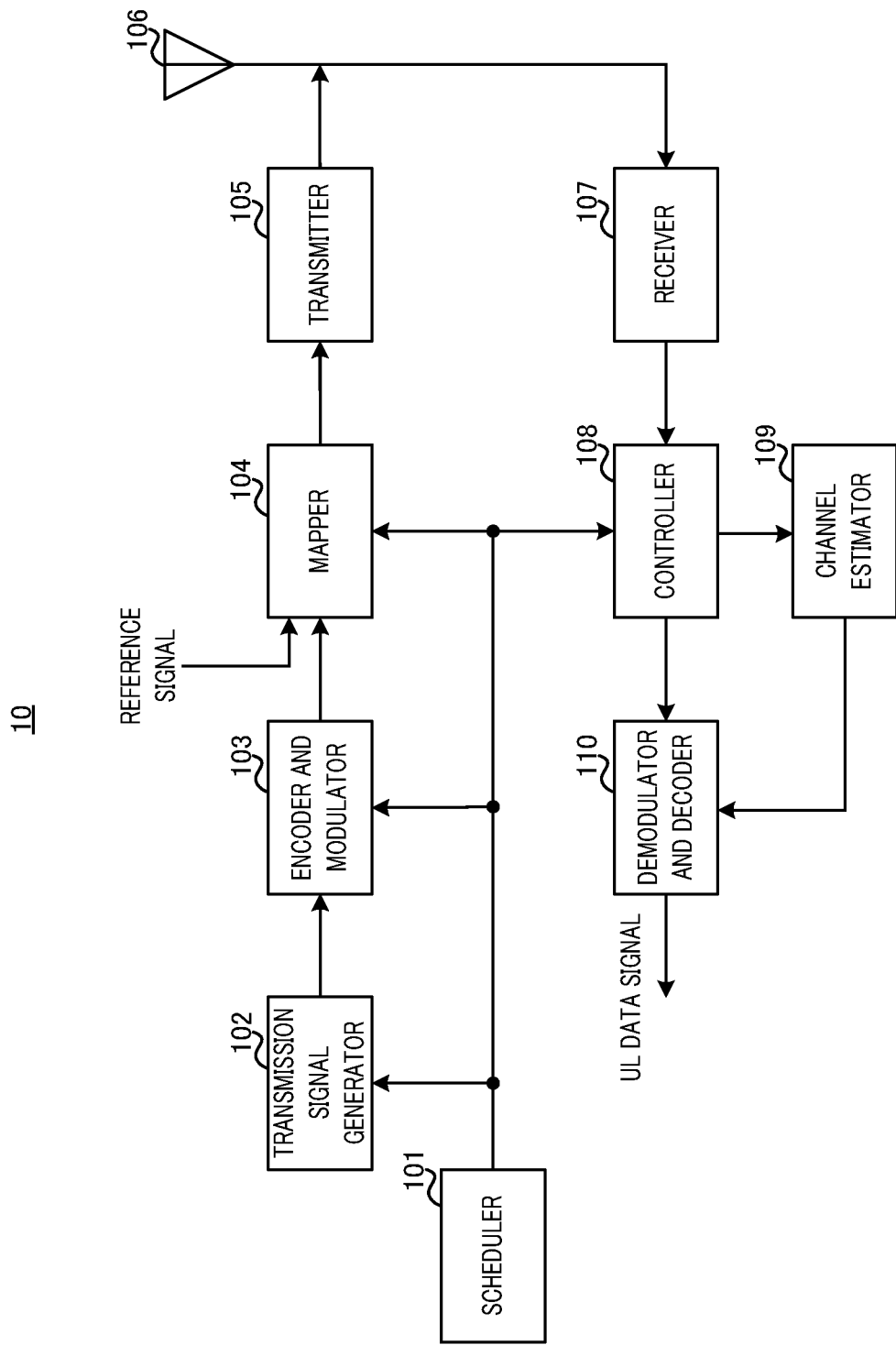
FIG. 1 is a block diagram illustrating an example of entire configuration of a radio base station according to one embodiment of the present invention.
Figure 2:
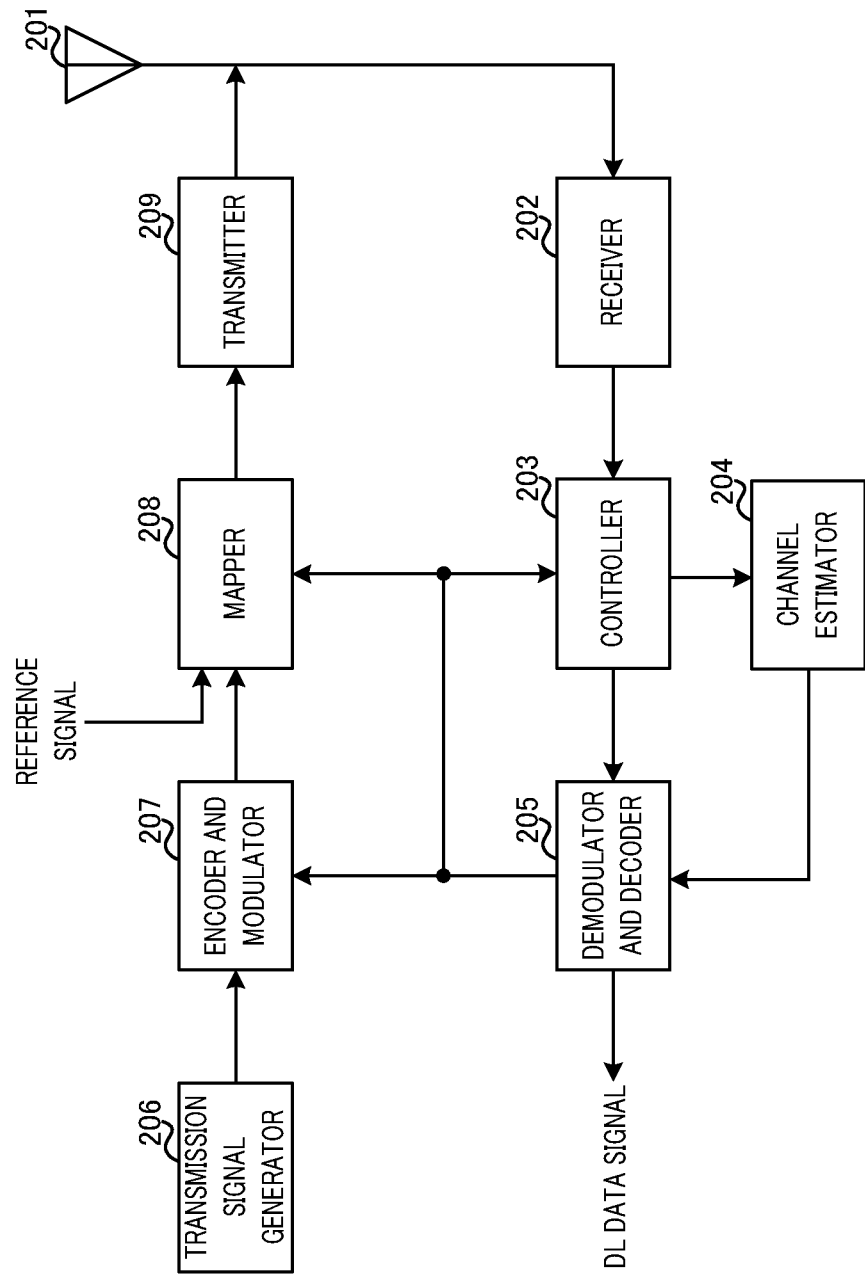
FIG. 2 is a block diagram illustrating an example of entire configuration of a user terminal according to one embodiment of the present invention.

A radio communication system according to the present embodiment includes radio base station 10 (also referred to as eNodeB (eNB) or gNodeB (gNB), for example) as illustrated in FIG. 1, and user terminal 20 (also referred to as User Equipment (UE), for example) as illustrated in FIG. 2. User terminal 20 is wirelessly connected (wirelessly accesses) to radio base station 10.

Radio base station 10 transmits a downlink (DL) control signal to user terminal 20 using a downlink control channel (e.g., Physical Downlink Control Channel (PDCCH)). Radio base station 10 transmits a DL data signal and demodulation reference signal to user terminal 20 using a DL data channel (e.g., Physical Downlink Shared Channel (PDSCH)). The demodulation reference signal is a signal for demodulation of the DL data signal. Hereinbelow, the demodulation reference signal is referred to as DMRS, appropriately.

User terminal 20 transmits an uplink (UL) control signal to radio base station 10 using an UL control channel (e.g., Physical Uplink Control Channel (PUCCH)) or UL data channel (e.g., UL shared channel (Physical Uplink Shared Channel (PUSCH))). User terminal 20 transmits an UL data signal and DMRS to radio base station 10 using the UL data channel (e.g., UL shared channel (Physical Uplink Shared Channel (PUSCH))).

The radio communication system in the present embodiment supports two types of mapping pattern (Configuration types 1 and 2) for DMRS(s), for example. In addition, the radio communication system in the present embodiment supports various DMRS arrangement methods. The DMRS arrangement methods include an arrangement method in which the DMRS and the data signal are frequency-multiplexed, and an arrangement method in which the DMRSs of different ports are multiplexed, for example.

The downlink channel and uplink channel through which radio base station 10 and user terminal 20 transmit or receive signals are not limited to the aforementioned PDCCH, PDSCH, PUCCH, PUSCH, and the like. Other channels, such as a Physical Broadcast Channel (PBCH), Random Access Channel (RACH), or the like may be applicable as the downlink channel and uplink channel through which radio base station 10 and user terminal 20 transmit or receive signals, for example.

Further, as with FIGS. 1 and 2, the signal waveform of a DL and/or UL signal generated at radio base station 10 or user terminal 20 may be based on Orthogonal Frequency Division Multiplexing (OFDM) modulation. Alternatively, the signal waveform of the DL and/or UL signal may be based on Single Carrier-Frequency Division Multiple Access (SC-FDMA) or DFT-Spread-OFDM (DFT-S-OFDM). Alternatively, the signal waveform of the DL and/or UL signal may be other signal waveforms. Illustration of components for generating a signal waveform (e.g., an IFFT processor, CP adder, CP remover, FFT processing part, and the like) is omitted in FIGS. 1 and 2.

<Radio Base Station>

FIG. 1 is a block diagram illustrating an example of entire configuration of radio base station 10 according to the present embodiment. Radio base station 10 includes scheduler 101, transmission-signal generator 102, encoder and modulator 103, mapper 104, transmitter 105, antenna 106, receiver 107, controller 108, channel estimator 109, and demodulator and decoder 110. Radio base station 10 may have a Multi-User Multiple-Input Multiple-Output (MU-MIMO) configuration for communicating simultaneously with a plurality of user terminals 20. Alternatively, radio base station 10 may have a Single-User Multiple-Input Multiple-Output (SU-MIMO) configuration for communicating with a single user terminal 20. Alternatively, radio base station 10 may have both of the SU-MIMO and MU-MIMO configurations.

Scheduler 101 performs scheduling (e.g., resource allocation and port assignment) of a DL signal (DL data signal, DL control signal, DMRS, or the like). In addition, scheduler 101 performs scheduling (e.g., resource allocation and port assignment) of an UL signal (UL data signal, UL control signal, DMRS, or the like).

In scheduling, scheduler 101 selects, from "Configuration type 1" and "Configuration type 2," a mapping pattern configuration indicating resource elements on which the DMRS in the DL signal is mapped. For example, scheduler 101 selects one mapping pattern from Configuration type 1 and Configuration type 2 based on propagation path environments (e.g., communication quality and frequency selectivity) and/or requirements (moving speed of a supported terminal and the like) and/or the performance of radio base station 10 or user terminal 20. Alternatively, a single mapping pattern may be predetermined.

Scheduler 101 configures, in the mapping pattern, a port number (port index) to be assigned to user terminal 20. Scheduler 101 also configures parameters related to DMRS arrangement. The parameters related to DMRS arrangement include at least one parameter indicating the port number to be assigned to user terminal 20, the number of ports, the number of symbols in which DMRSs are arranged, scrambling identifier (scrambling ID), or the DMRS arrangement method, for example. The scrambling ID is an identifier used for reducing interference between the DMRS ports of the same number, and is used for initialization of a sequence used for the DMRS.

Hereinafter, the set of parameters related to DMRS arrangement is referred to as a configuration info nation piece, appropriately. Note that, the set of parameters related to DMRS arrangement is an example of information included in the configuration information piece, and the present invention is not limited to this example. The configuration information piece may also include other information.

The configuration information piece is included, for example, in downlink control information (DCI). Specifically, indices related to one or more bits of DMRS configuration information pieces included in the DCI are associated respectively with the DMRS configuration information pieces each of which includes at least one parameter different from one DMRS configuration information piece to another. In a table indicating correspondence between the indices related to the DMRS configuration information pieces and the configuration information pieces, possible combination patterns of a plurality of parameters related to the DMRS arrangement on radio resources are associated respectively with indices. Concrete examples of the table indicating the correspondence between the indices related to the DMRS configuration information pieces and the configuration information pieces will be described below.

Scheduler 101 determines the indices related to the DMRS configuration information pieces included in the DCI based on the configuration information pieces, and notifies user terminal 20 of the DCI including the determined indices.

Scheduler 101 outputs scheduling information including the configuration information pieces to transmission signal generator 102 and mapper 104.

Moreover, scheduler 101 configures a Modulation and Coding Scheme (MCS) (such as a coding rate, modulation scheme, and the like) for the DL data signal and the UL data signal based on the channel quality between radio base station 10 and user terminal 20, for example. Scheduler 101 outputs the information on the configured MCS to transmission signal generator 102 and encoder and modulator 103. As for the MCS configuration, the present invention is not limited to the case where radio base station 10 configures the MCS, but user terminal 20 may also configure the MCS. In the case where user terminal 20 configures the MCS, radio base station 10 may receive the MCS information from user terminal 20 (not illustrated).

Transmission signal generator 102 generates a transmission signal (including the DL data signal and the DL control signal). For example, the DL control signal includes the DCI containing the scheduling information (e.g., configuration information piece) or the MCS information output by scheduler 101. Transmission signal generator 102 outputs the generated transmission signal to encoder and modulator 103.

Based on the MCS information input from scheduler 101, for example, encoder and modulator 103 performs coding processing and modulation processing on the transmission signal input from transmission signal generator 102. Encoder and modulator 103 outputs the modulated transmission signal to mapper 104.

Mapper 104 maps the transmission signal input from encoder and modulator 103 to predetermined radio resources (DL resources) based on the scheduling information (e.g., DL resource allocation and configuration information piece) input from scheduler 101.

Mapper 104 also maps the DMRS to the predetermined radio resources (DL resources) based on the scheduling information. Mapper 104 outputs, to transmitter 105, the DL signal mapped to the radio resources.

Transmitter 105 performs transmission processing, such as up-conversion, amplification, and the like on the DL signal input from mapper 104, and transmits a radio frequency signal (DL signal) from antenna 106.

Receiver 107 performs reception processing, such as amplification, down-conversion, and the like on a radio frequency signal (UL signal) received by antenna 106, and outputs the UL signal to controller 108.

Based on the scheduling information (UL resource allocation) input from scheduler 101, controller 108 separates (demaps) the UL data signal and the DMRS from the UL signal input from receiver 107. Then, controller 108 outputs the UL data signal to demodulator and decoder 110, and outputs the DMRS to channel estimator 109.

Channel estimator 109 performs channel estimation using the DMRS of the UL signal, and outputs, to demodulator and decoder 110, a channel estimation value as an estimation result.

Demodulator and decoder 110 performs, based on the channel estimation value input from channel estimator 109, demodulation and decoding processing on the UL data signal input from controller 108. Demodulator and decoder 110 transfers the demodulated UL data signal to an application section (not illustrated). The application section performs processing such as that related to a higher layer above the physical layer or the MAC layer.

<User Terminal>

FIG. 2 is a block diagram illustrating an example of entire configuration of user terminal 20 according to the present embodiment. User terminal 20 includes antenna 201, receiver 202, controller 203, channel estimator 204, demodulator and decoder 205, transmission signal generator 206, encoder and modulator 207, mapper 208, and transmitter 209.

Receiver 202 performs reception processing, such as amplification, down-conversion, and the like on a radio frequency signal (DL signal) received by antenna 201, and outputs the DL signal to controller 203. The DL signal includes at least a DL data signal and a DMRS.

Controller 203 separates (demaps) the DL control signal and the DMRS from the DL signal input from receiver 202. Then, controller 203 outputs the DL control signal to demodulator and decoder 205, and outputs the DMRS to channel estimator 204.

At this time, controller 203 identifies, based on the table indicating correspondence between the indices related to the DMRS configuration information pieces and the configuration information pieces and based on the notified DCI, the port number assigned to user terminal 20, and determines the DMRS arrangement method for the identified port number. Then, controller 203 controls the reception processing on the DL signal.

In addition, based on the scheduling information (e.g., DL resource configuration information) input from demodulator and decoder 205, controller 203 separates (demaps) the DL data signal from the DL signal, and outputs the DL data signal to demodulator and decoder 205.

Channel estimator 204 performs channel estimation using the separated DMRS, and outputs, to demodulator and decoder 205, a channel estimation value as an estimation result.

Demodulator and decoder 205 demodulates the DL control signal input from controller 203. In addition, demodulator and decoder 205 performs decoding processing (e.g., blind detection processing) on the demodulated DL control signal. Demodulator and decoder 205 outputs, to controller 203 and mapper 208, the scheduling information (e.g., DL/UL resource allocation) obtained by demodulation of the DL control signal and addressed to the corresponding user terminal, and outputs MCS information for the UL data signal to encoder and modulator 207.

Based on the MCS information for the DL data signal included in the DL control signal input from controller 203, demodulator and decoder 205 performs demodulation and decoding processing on the DL data signal input from controller 203 using the channel estimation value input from channel estimator 204. In addition, demodulator and decoder 205 transfers the demodulated DL data signal to an application section (not illustrated). The application section performs processing such as that related to a higher layer above the physical layer or the MAC layer.

Transmission signal generator 206 generates a transmission signal (including an UL data signal or UL control signal), and outputs the generated transmission signal to encoder and modulator 207.

Based on the MCS information input from demodulator and decoder 205, for example, encoder and modulator 207 performs coding processing and modulation processing on the transmission signal input from transmission signal generator 206. Encoder and modulator 207 outputs the modulated transmission signal to mapper 208.

Mapper 208 maps the transmission signal input from encoder and modulator 207 on predetermined radio resources (UL resources) based on the scheduling information (UL resource allocation) input from demodulator and decoder 205. Mapper 208 also maps the DMRS on the predetermined radio resources (UL resources) based on the scheduling information.

Transmitter 209 performs transmission processing, such as upconversion, amplification, and the like on the UL signal (including at least the UL data signal and DMRS) input from mapper 208, and transmits a radio frequency signal (UL signal) from antenna 201.

In the radio communication system including radio base station 10 and user terminal 20 as described above, a front-loaded DMRS is used as an example of the DMRS. The front-loaded DMRS is arranged forward in the time direction in a resource unit (or in a subframe) that is a unit of resource allocation. With the front-loaded DMRS arranged forward, it is possible to reduce processing time taken for the channel estimation and demodulation processing in the radio communication system.

For example, two mapping patterns are specified as mapping patterns of the front-loaded DMRS. Hereinafter, a description of the two mapping patterns will be given.

<First Mapping Patterns (Configuration type 1)>

FIG. 3 illustrates first mapping pattern examples in the present embodiment. FIG. 3 illustrates mapping patterns of front-loaded DMRSs (the front-loaded DMRSs may hereinafter be simply referred to as "DMRSs" for convenience of description) of from Port #0 to Port #7. The first mapping patterns in FIG. 3 include mapping pattern A in which the DMRS(s) of one port to four ports is arranged in one symbol, and mapping pattern B in which the DMRS(s) of one port to eight ports is arranged in two symbols.

Each of the mapping patterns illustrates the mapping position of DMRS of each port within the resource unit (RU) (also called a resource block, resource block pair, or the like) which is a unit of resource allocation.

The RU has a configuration of 168 Resource Elements (REs) arranged in 14 columns in the time direction and in 12 rows in the frequency direction. One RE is a radio resource region defined by one symbol and one subcarrier. That is, one RU is configured by 14 symbols and 12 subcarriers.

Note that, 14 symbols in the time direction of the RU are referred to as SB1 to SB14 sequentially from the left in the following description. Note also that, 12 subcarriers in the frequency direction of the RU are referred to as SC1 to SC12 sequentially from the bottom.

A control signal channel (e.g., PDCCH) is arranged on the REs in two leading symbols (that is, SB1 and SB2) in the RU. Note that, the number of symbols for the control signal channel is not limited to two. Note also that, the position of DMRS to be mapped is not limited to the third and the fourth symbols (SB3 and SB4), and may also be the fourth and the fifth symbols (SB4 and SB5). For example, in the UL, the DMRS may be arranged in the leading one of symbols to which the PUSCH is mapped.

The number of ports mapping pattern A supports is from one to a maximum of four. The number of ports mapping pattern B supports is from one to a maximum of eight. The first mapping patterns are Interleaved Frequency Division Multiplexing (IFDM)-based, and include a configuration in which the frequency-direction insertion density of DMRS (the arrangement interval and the number of DMRSs in the frequency direction) per one layer is comparatively high. In the first mapping patterns, the DMRSs of the same port are arranged at intervals of one subcarrier. This arrangement may be called "Comb2" or IFDM (RPF=2).

In the first mapping patterns, Code Division Multiplexing (CDM) in the frequency direction is applied to multiplex port #0 and port #1 and to multiplex port #2 and port #3. For example, an Orthogonal Cover Code (OCC) (which may also be referred to as Cyclic Shift (CS) in the present patterns) is used in the CDM in the frequency direction. For example, the set of {+1, +1} is used as the OCC for port #0 and port #2, and the set of {+1, −1} is used as the OCC for port #1 and #3. Hereinafter, the CDM in the frequency direction in which the OCC is used is referred to as Frequency Domain Orthogonal Cover Code (FD-OCC).

In mapping pattern B of the first mapping patterns, the CDM in the time direction is applied to multiplex the set of port #0 and port #1 and the set of port #4 and port #6. Similarly, the CDM in the time direction is applied to multiplex the set of port #2 and port #3 and the set of port #5 and port #7. The OCC is used in the CDM in the time direction, for example. Hereinafter, the CDM in the time direction in which the OCC is used is referred to as Time Domain Orthogonal Cover Code (TD-OCC).

The indices of ports #4 and above in FIG. 3 (that is, from port #4 to port #7) are examples, and the present invention is not limited to these indices. For example, the correspondence between the arrangement of DMRS of each port and the port index in FIG. 3 may be changed appropriately.

<Second Mapping Patterns (Configuration Type 2)>

Figure 4:
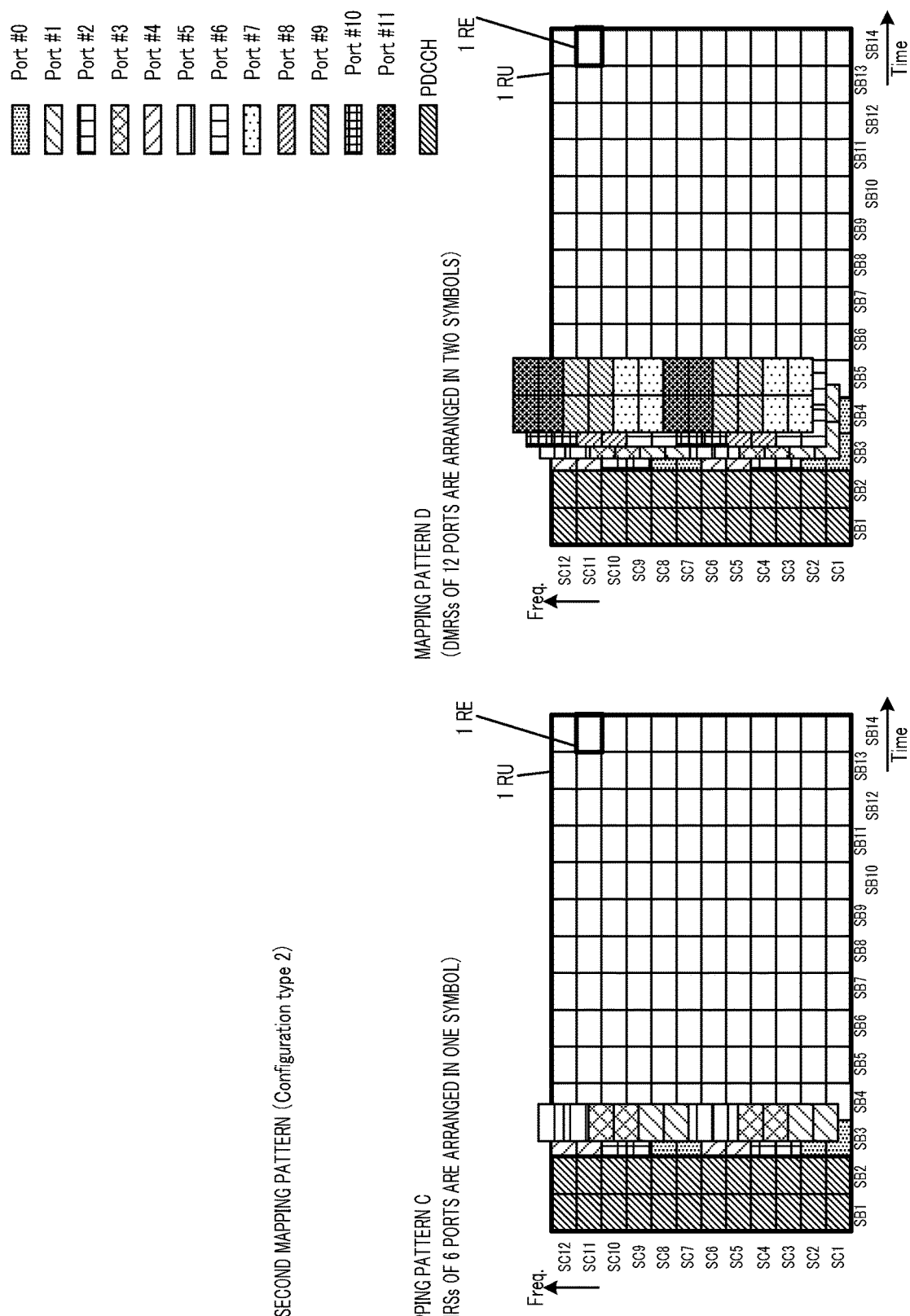
FIG. 4 illustrates second mapping pattern examples in one embodiment of the present invention.

FIG. 4 illustrates second mapping pattern examples in the present embodiment. FIG. 4 illustrates mapping patterns of DMRSs of from Port #0 to Port #11. The second mapping patterns in FIG. 4 include mapping pattern C in which the DMRS(s) of one port to six ports is arranged in one symbol, and mapping pattern D in which the DMRS(s) of one port to twelve ports is arranged in two symbols.

The control signal channel (e.g., PDCCH) is arranged on the REs in two leading symbols (that is, SB1 and SB2) in the RU. Note that, the number of symbols for the control signal channel is not limited to two. Note also that, the position of DMRS to be mapped is not limited to the third and the fourth symbols, and may also be the fourth and the fifth symbols (SB4 and SB5). For example, in the UL, the DMRS may be arranged in the leading one of symbols to which the PUSCH is mapped.

The number of ports mapping pattern C supports is from one to a maximum of six. The number of ports mapping pattern D supports is from one to a maximum of 12.

In the second mapping patterns, the CDM in the frequency direction (e.g., FD-OCC (which may also be called CS)) is applied to multiplex port #0 and port #1, to multiplex port #2 and port #3, and to multiplex port #4 and port #5. For example, the set of {+1, +1} is used as the OCC for ports #0, #2, and #4, and the set of {+1, −1} is used as the OCC for ports #1, #3, and #5.

In mapping pattern D of the second mapping patterns, the CDM in the time direction (e.g., TD-OCC) is applied to multiplex the set of port #0 and port #1 and the set of port #6 and port #7. Similarly, the CDM in the time direction is applied to multiplex the set of port #2 and port #3 and the set of port #8 and port #9, and to multiplex the set of port #4 and port #5 and the set of port #10 and port #11.

Note that, the indices of ports #6 and above in FIG. 4 (that is, from port #6 to port #11) are examples, and the present invention is not limited to these indices. For example, the correspondence between the arrangement of DMRS of each port and the port index in FIG. 4 may be changed appropriately.

The DMRS of each port specified in the first and the second mapping patterns as described above is arranged in the RU by applying various arrangement methods.

For example, the DMRS of each port is frequency-multiplexed with the data signal (e.g., PDSCH or PUSCH) in the same symbol. That is, an arrangement method in which the DMRS is frequency-multiplexed with the data signal is applied in this case.

Further, the DMRS of each port is arranged in the RU while multiplexed with another DMRS of a different port using various multiplexing methods (e.g., the CDM in the frequency direction, the CDM in the time direction, and Frequency Division Multiplexing (FDM)).

For example, notifying by using the DCI the DMRS configuration information pieces covering all these arrangement methods causes an increase in DCI signaling overhead.

Therefore, in the present embodiment, a specific arrangement method is supported when at least one of the parameters of a DMRS configuration information piece included in the DCI satisfies a predetermined condition. A restriction that the specific arrangement method is not supported when the configuration information piece does not satisfy the predetermined condition is provided.

With this restriction, indices associating the specific arrangement method with configuration information pieces not satisfying the predetermined condition become unnecessary, so that it is possible to reduce an increase in DCI signaling overhead while ensuring the flexibility to be able to notify the various arrangement methods.

Hereinbelow, a description will be given of an example of the two arrangement methods particularly described above and the condition of the configuration information pieces associated with the two arrangement methods.

In the following description, the first mapping pattern of the aforementioned two mapping patterns will be described as the example. The present invention is not limited to the first mapping pattern, but is also applicable in the second mapping pattern.

<Arrangement Method in which DMRS is Frequency-Multiplexed with Data Signal>

To begin with, a description will be given of an arrangement method in which a DMRS is frequency-multiplexed with a data signal and of a condition of configuration information piece associated with such an arrangement method.

<Condition 1>

Condition 1 is a condition that port numbers to be assigned to user terminal 20 include a specific port number. That is, when the port numbers to be assigned to user terminal 20 include the specific port number, the arrangement method in which the DMRS is frequency-multiplexed with the data signal is supported. In other words, when the port numbers to be assigned to user terminal 20 do not include the specific port number, the arrangement method in which the DMRS is frequency-multiplexed with the data signal is not supported.

FIG. 5 illustrates first examples of an arrangement method in the present embodiment. FIG. 6 illustrates second examples of an arrangement method in the present embodiment.

FIGS. 5 and 6 illustrate the examples of arrangement of the DMRS and the data signal to be supported when port #0 as the specific port number in condition 1 is assigned.

As illustrated in FIG. 5, when the port number assigned to user terminal 20 is port #0, arrangement method a-1 in which the DMRS is frequency-multiplexed with the data signal and arrangement method a-2 in which the DMRS is not frequency-multiplexed with the data signal are both supported. That is, when the port number assigned to user terminal 20 is port #0, the arrangement method in which the DMRS is frequency-multiplexed with the data signal is accepted.

On the other hand, as illustrated in FIG. 6, when the port number assigned to user terminal 20 is port #1, arrangement method b-1 in which the DMRS is frequency-multiplexed with the data signal is not supported, but arrangement method b-2 in which the DMRS is not frequency-multiplexed with the data signal is supported.

Note that, when the port number assigned to user terminal 20 is port #0, radio base station 10 may determine which of the two supported arrangement methods to select.

For example, radio base station 10 may select one of the two supported arrangement methods based on the downlink channel quality (e.g., Signal to Noise Ratio (SNR) and/or Channel Quality Indicator (CQI)) notified by user terminal 20, or based on the uplink channel quality measured by radio base station 10 using a reference signal transmitted from user terminal 20. In particular, radio base station 10 may select arrangement method a-1 when the channel quality is equal to or greater than a predetermined value or select arrangement method a-2 when the channel quality is less than the predetermined value, and, radio base station 10 may perform scheduling of arrangement of the downlink signal in accordance with the selected arrangement method.

Alternatively, radio base station 10 may select one of the two supported arrangement methods based on whether the SU-MIMO or MU-MIMO is applied. To be more specific, radio base station 10 may select arrangement method a-1 when the SU-MIMO is applied or select arrangement method a-2 when the MU-MIMO is applied, and radio base station 10 may perform the scheduling of arrangement of the downlink signal in accordance with the selected arrangement method.

Note that, the present invention is not limited to the case where the specific port number is port #0. The specific port number may be a port number different from port #0. Note also that, the number of specific port numbers is not limited to one, but may also be more than one. In the case where the number of specific port numbers is more than one, the signaling overhead increases, but the flexibility of port assignment further increases.

<Condition 2>

Condition 2 is a condition that the scrambling ID used for reducing the interference between the DMRS ports of the same number is a specific ID. That is, when the scrambling ID is the specific ID, the arrangement method in which the DMRS is frequency-multiplexed with the data signal is supported. In other words, when the scrambling ID is not the specific ID, the arrangement method in which the DMRS is frequency-multiplexed with the data signal is not supported.

Figure 7:
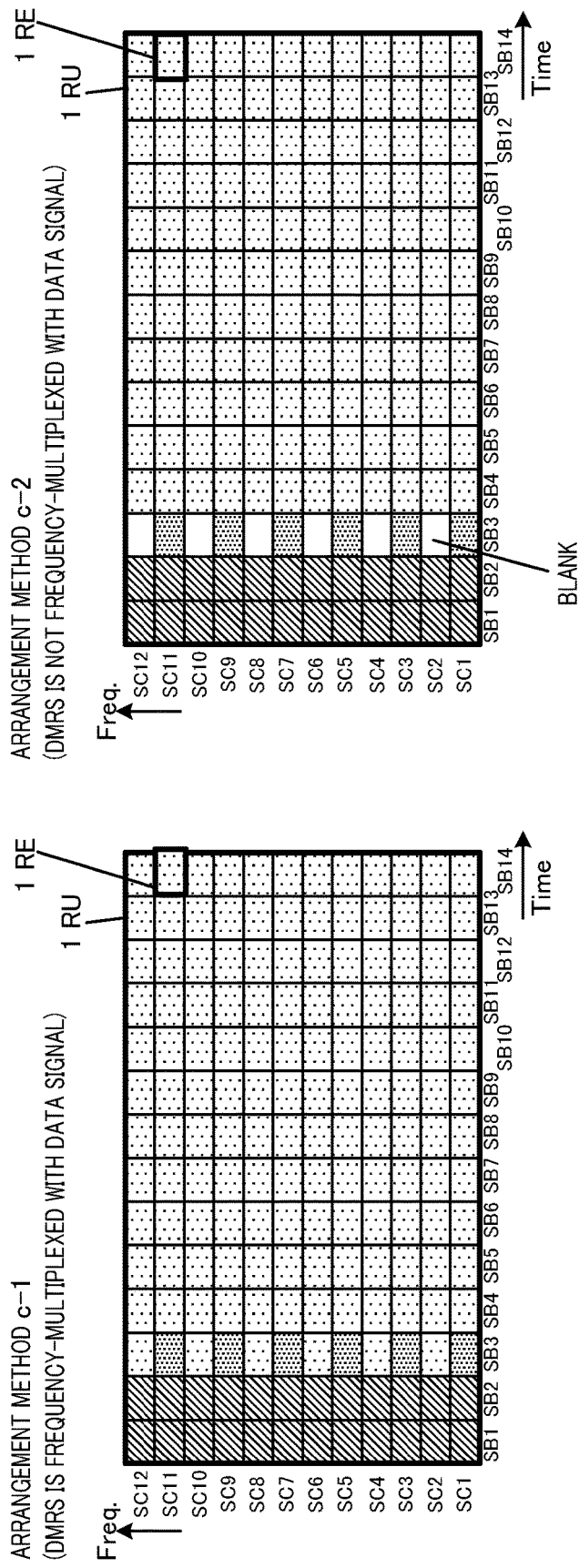
FIG. 7 illustrates third examples of an arrangement method in one embodiment of the present invention.

FIG. 7 illustrates third examples of an arrangement method in the present embodiment. FIG. 7 illustrates the examples of arrangement of the DMRS and the data signal to be supported when port #0 is assigned to user terminal 20 and scrambling ID #0 is the specific ID.

As illustrated in FIG. 7, when the scrambling ID assigned to user terminal 20 is scrambling ID #0, arrangement method c-1 in which the DMRS is frequency-multiplexed with the data signal and arrangement method c-2 in which the DMRS is not frequency-multiplexed with the data signal are both supported. That is, when the scrambling ID assigned to user terminal 20 is scrambling ID #0, the arrangement method in which the DMRS is frequency-multiplexed with the data signal is accepted.

On the other hand, when the scrambling ID assigned to user terminal 20 is not scrambling ID #0, for example, when the scrambling ID assigned to user terminal 20 is scrambling ID #1, arrangement method c-1 in which the DMRS is frequency-multiplexed with the data signal is not supported, but arrangement method c-2 in which the DMRS is not frequency-multiplexed with the data signal is supported.

Note that, when the scrambling ID assigned to user terminal 20 is scrambling ID #0, radio base station 10 may determine which of the two supported arrangement methods to select.

For example, radio base station 10 may select one of the two supported arrangement methods based on the downlink channel quality (e.g., SNR and/or CQI) notified by user terminal 20, or based on the uplink channel quality measured by radio base station 10 using a reference signal transmitted from user terminal 20. In particular, radio base station 10 may select arrangement method c-1 when the channel quality is equal to or greater than a predetermined value or select arrangement method c-2 when the channel quality is less than the predetermined value, and, radio base station 10 may perform scheduling of arrangement of the downlink signal in accordance with the selected arrangement method.

Alternatively, radio base station 10 may select one of the two supported arrangement methods based on whether the SU-MIMO or MU-MIMO is applied. To be more specific, radio base station 10 may select arrangement method c-1 when the SU-MIMO is applied or select arrangement method c-2 when the MU-MIMO is applied, and radio base station 10 may perform the scheduling of arrangement of the downlink signal in accordance with the selected arrangement method.

Note that, the present invention is not limited to the case where the specific scrambling ID is scrambling ID #0. The specific scrambling ID may be a scrambling ID different from scrambling ID #0. Note also that, the number of specific scrambling IDs is not limited to one, but may also be more than one. In the case where the number of specific scrambling IDs is more than one, the signaling overhead increases, but the flexibility of port assignment further increases.

<Condition 3>

Condition 3 is a condition that the number of symbols in which the DMRS is arranged is the specific number of symbols. That is, when the number of symbols in which the DMRS is arranged is the specific number of symbols, the arrangement method in which the DMRS is frequency-multiplexed with the data signal is supported. In other words, when the number of symbols in which the DMRS is arranged is not the specific number of symbols, the arrangement method in which the DMRS is frequency-multiplexed with the data signal is not supported.

FIG. 8 illustrates fourth examples of an arrangement method in the present embodiment. FIG. 9 illustrates fifth examples of an arrangement method in the present embodiment.

FIGS. 8 and 9 illustrate the examples of arrangement of the DMRS and the data signal to be supported when the number of symbols is one which is the specific number of symbols in which the DMRS is arranged in condition 3.

As illustrated in FIG. 8, when the number of symbols in which the DMRS is arranged is one, arrangement method d-1 in which the DMRS is frequency-multiplexed with the data signal and arrangement method d-2 in which the DMRS is not frequency-multiplexed with the data signal are both supported. That is, when the number of symbols in which the DMRS is arranged is one, the arrangement method in which the DMRS is frequency-multiplexed with the data signal is accepted.

On the other hand, as illustrated in FIG. 9, when the number of symbols in which the DMRS is arranged is two, arrangement method e-1 in which the DMRS is frequency-multiplexed with the data signal is not supported, but arrangement method e-2 in which the DMRS is not frequency-multiplexed with the data signal is supported.

Note that, when the number of symbols in which the DMRS is arranged is one, radio base station 10 may determine which of the two supported arrangement methods to select.

For example, radio base station 10 may select one of the two supported arrangement methods based on the downlink channel quality (e.g., SNR and/or CQI) notified by user terminal 20, or based on the uplink channel quality measured by radio base station 10 using a reference signal transmitted from user terminal 20. In particular, radio base station 10 may select arrangement method d-1 when the channel quality is equal to or greater than a predetermined value or select arrangement method d-2 when the channel quality is less than the predetermined value, and, radio base station 10 may perform scheduling of arrangement of the downlink signal in accordance with the selected arrangement method.

Alternatively, radio base station 10 may select one of the two supported arrangement methods based on whether the SU-MIMO or MU-MIMO is applied. To be more specific, radio base station 10 may select arrangement method d-1 when the SU-MIMO is applied or select arrangement method d-2 when the MU-MIMO is applied, and radio base station 10 may perform the scheduling of arrangement of the downlink signal in accordance with the selected arrangement method.

The present invention is not limited to the case where the specific number of symbols is one. The specific number of symbols may also be the number other than one.

Note that, in those arrangement methods of the aforementioned arrangement methods in which the DMRS is not frequency-multiplexed with the data signal (arrangement method a-2, arrangement method b-2, arrangement method c-2, arrangement method d-2, and arrangement method e-2), there are REs (blank REs) on which no signal other than the DMRS is arranged in the symbol in which the DMRS is arranged. Accordingly, a portion of the transmit power for one symbol which is to be allocated to the blank REs is left. In this case, radio base station 10 may boost the transmit power of DMRS. User terminal 20 may be notified implicitly or explicitly of whether or not boosting was performed and/or of the magnitude of the boosted transmit power.

As described above, the arrangement method in which the DMRS is frequency-multiplexed with the data signal is associated with the configuration information piece satisfying the specific condition, so that the arrangement method in which the DMRS is frequency-multiplexed with the data signal is supported when the specific condition is satisfied. Thus, the arrangement method in which the DMRS is frequency-multiplexed with the data signal does not need to be associated with those configuration information pieces not satisfying the specific condition, so that it is possible to reduce an increase in the DCI signaling overhead.

<Arrangement Method 1 in which DMRSs of a plurality of Ports are Multiplexed>

Next, a description will be given of an arrangement method in which the DMRSs of a plurality of ports are multiplexed and of a condition to be associated with such an arrangement method.

Figure 10:
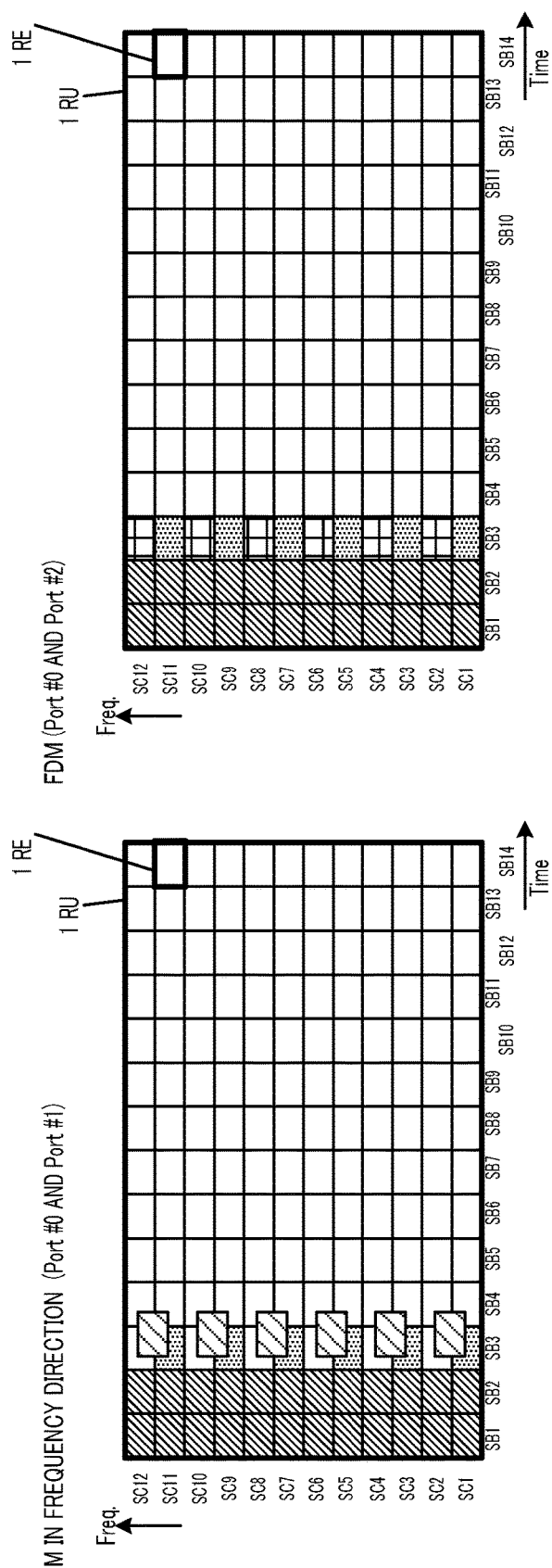
FIG. 10 illustrates first examples of an arrangement method in which DMRSs of two ports are multiplexed in one embodiment of the present invention.

FIG. 10 illustrates first examples of an arrangement method in which the DMRSs of two ports are multiplexed in the present embodiment. FIG. 10 illustrates the examples of combinations of two ports for cases where the DMRSs are arranged in one symbol, and two multiplexing methods different depending on the combinations, that is, arrangement examples in each of which the CDM or FDM in the frequency direction is applied.

In mapping pattern A of the first mapping patterns described above (see FIG. 3), when two ports are assigned to user terminal 20, different DMRS multiplexing methods are applied depending on two port numbers. In such a case, notifying by using the DCI the DMRS configuration information pieces covering all the different multiplexing methods causes an increase in the DCI signaling overhead.

Accordingly, in the present embodiment, when the condition that the number of ports to be assigned to user terminal 20 is two are satisfied, the arrangement method in which one of the two multiplexing methods illustrated in FIG. 10 is applied is supported.

For example, when the number of symbols for DMRS is one and the supported multiplexing method is the CDM in the frequency direction, the multiplexing method of FDM is not supported. Alternatively, when the supported multiplexing method is the FDM, the multiplexing method of CDM in the frequency direction is not supported.

For example, when the number of symbols in which the DMRS is arranged is one and the supported multiplexing method is the CDM in the frequency direction, the set of ports (e.g., port #0 and port #1) of DMRSs to be multiplexed by applying the CDM in the frequency direction is assigned to user terminal 20. In the meanwhile, the set of ports (e.g., port #0 and port #2) of DMRSs to be multiplexed by applying the FDM is not assigned to user terminal 20 in this case.

FIG. 11 illustrates second examples of the arrangement method in which the DMRSs of two ports are multiplexed in the present embodiment. FIG. 11 illustrates the examples of combinations of two ports for cases where the DMRSs are arranged in two symbols, and three multiplexing methods different depending on the combinations, that is, arrangement examples in each of which the CDM or FDM in the frequency direction or the CDM in the time direction is applied. Note that, the CDM in the time direction is applied when configured.

In mapping pattern B of the first mapping patterns described above (see FIG. 3), when two ports are assigned to user terminal 20, different DMRS multiplexing methods are applied depending on two port numbers. In such a case, notifying by using the DCI the DMRS configuration information pieces covering all the different multiplexing methods causes an increase in the DCI signaling overhead.

Accordingly, in the present embodiment, when the condition that the number of ports to be assigned to user terminal 20 is two are satisfied, the arrangement method in which one of the three multiplexing methods illustrated in FIG. 11 is applied is supported.

For example, when the number of symbols for DMRS is two and the supported multiplexing method is the CDM in the frequency direction, the multiplexing methods of FDM and of CDM in the time direction are not supported. Alternatively, when the number of symbols for DMRS is two and the supported multiplexing method is the FDM, the multiplexing methods of CDM in the frequency direction and of CDM in the time direction are not supported. Alternatively, when the number of symbols for DMRS is two and the supported multiplexing method is the CDM in the time direction, the multiplexing methods of CDM in the frequency direction and of FDM are not supported.

For example, when the number of symbols in which the DMRS is arranged is two and the supported multiplexing method is the CDM in the frequency direction, the set of ports (e.g., port #0 and port #1) of DMRSs to be multiplexed by applying the CDM in the frequency direction is assigned to user terminal 20. In the meanwhile, the sets of ports (e.g., the set of port #0 and port #2 or the set of port #0 and port #4) of DMRSs to be multiplexed by applying the FDM or the CDM in the time direction are not assigned to user terminal 20 in this case.

As described above, the arrangement method using the specific multiplexing method is associated with the configuration information piece satisfying the condition that the number of ports to be assigned to user terminal 20 is two, so that the arrangement method using the specific multiplexing method is supported when the condition is satisfied. With this configuration, the condition that the number of ports to be assigned to user terminal 20 is two does not need to be associated with an arrangement method using a multiplexing method different from the specific arrangement method, so that it is possible to reduce an increase in the DCI signaling overhead.

Note that, when the number of symbols for DMRS is two, two of the three multiplexing methods illustrated in FIG. 11 may be supported. When the number of supported multiplexing methods is two, the flexibility of DMRS configuration increases although the DCI overhead increases.

Note also that, multiplexing methods different between the arrangement described with reference to FIG. 10 in which the multiplexing method for multiplexing the DMRS in one symbol is used and the arrangement described with reference to FIG. 11 in which the multiplexing method for multiplexing the DMRS in two symbols is used may be supported. For example, the CDM in the frequency direction may be supported for the multiplexing method for multiplexing the DMRS in one symbol, and the CDM in the time direction may be supported for the multiplexing method for multiplexing the DMRS in two symbols.

Note also that, radio base station 10 and user terminal 20 may possess in advance tables of indices respectively related to DMRS configuration information pieces for supporting different multiplexing methods, and one of the tables to be employed may be indicated by higher layer signaling.

For example, when the DMRS is arranged in one symbol, tables respectively supporting the CDM in the frequency direction and the FDM as the multiplexing methods of DMRSs of two ports may be stored individually. User terminal 20 may receive, from radio base station 10, the signaling indicating which multiplexing method (i.e., the CDM in the frequency direction or the FDM) is to be applied, and perform the reception processing based on the table corresponding to the applied multiplexing method.

Further, when the DMRS is arranged in two symbols, the tables respectively supporting the CDM in the frequency direction, the FDM, and the CDM in the time direction as the multiplexing methods of DMRSs of two ports may, for example, be stored individually. User terminal 20 may receive, from radio base station 10, the signaling indicating what multiplexing method (i.e., the CDM in the frequency direction or the FDM or the CDM in the time direction) is to be applied, and perform the reception processing based on the table corresponding to the applied multiplexing method.

<Arrangement Method 2 in which DMRSs of a plurality of Ports are Multiplexed>

Next, a description will be given of a point that the sets of port numbers to be assigned are changed depending on whether or not the CDM in the time direction is supported.

Figure 12:
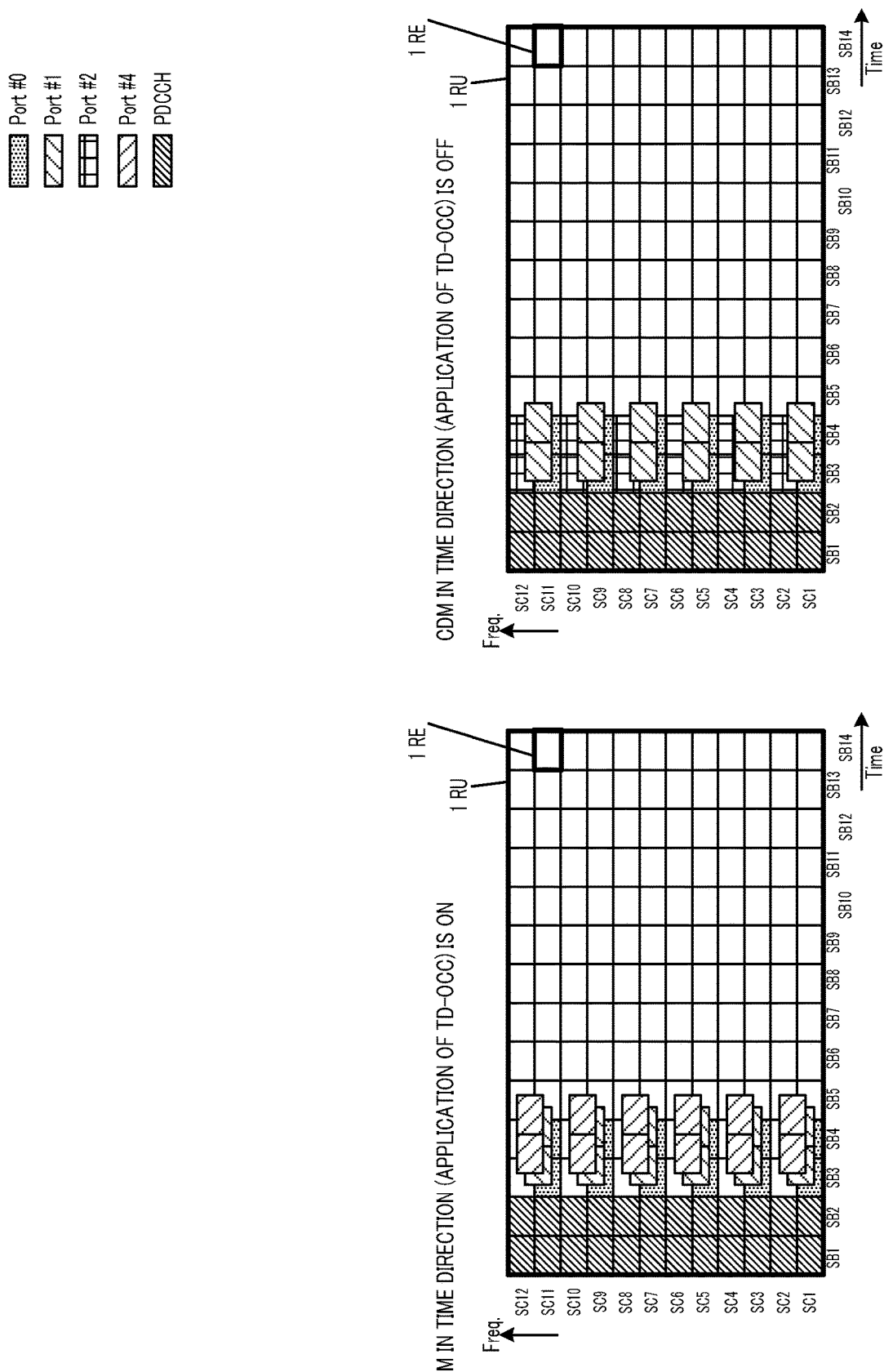
FIG. 12 illustrates examples of an arrangement method in which DMRSs of three ports are multiplexed in one embodiment of the present invention.

FIG. 12 illustrates examples of an arrangement method in which the DMRSs of three ports are multiplexed in the present embodiment. FIG. 12 illustrates two arrangement examples for the DMRSs of three ports, in each of which a different multiplexing method is applied.

When the CDM in the time direction (e.g., applying the TD-OCC) is supported (in the case of "On"), port #0, port #1, and port #4 are assigned to user terminal 20. Here, the CDM in the frequency direction and the CDM in the time direction are applied for multiplexing between port #0, port #1, and port #4.

When the CDM in the time direction (e.g., applying the TD-OCC) is not supported (in the case of "Off"), port #0, port #1, and port #2 are assigned to user terminal 20. Here, the CDM in the frequency direction is applied for multiplexing between port #0 and port #1. The FDM is applied for multiplexing between the set of port #0 and port #1 and port #2.

For example, when three ports are assigned to user terminal 20, two sets of port numbers are associated, depending on whether or not the CDM in the time direction is supported, with the indices in the DCI indicating that three ports are assigned to user terminal 20. When user terminal 20 receives notification of the indices in the DCI indicating that three ports are assigned to user terminal 20, user terminal 20 determines, based on whether or not the CDM in the time direction is supported, the port numbers assigned to user terminal 20.

The information indicating whether or not the CDM in the time direction is supported may, for example, be notified using the higher layer signaling or may be notified implicitly depending on whether or not a Phase Tracking Reference Signal (PTRS) is configured.

As described above, the configuration information piece including two sets of port numbers corresponding to two different multiplexing methods is associated with one index related to the DMRS configuration information piece included in one DCI, so that two sets of port numbers do not need to be associated with different indices, respectively, and accordingly, it is possible to reduce an increase in the DCI signaling overhead.

Note that, the arrangement methods illustrated in FIGS. 5 to 12 are examples, and the present invention is not limited to these examples. For example, the number of symbols for a control signal channel (e.g., PDCCH) is not limited to two. Note also that, the position of one symbol to which the DMRS is mapped is not limited to the third symbol (SB3). Note also that, the positions of two symbols to which the DMRS is mapped are not limited to the third and the fourth symbols (SB3 and SB4), and may also be the fourth and the fifth symbols (SB4 and SB5). Further, in the UL, the DMRS may be arranged in the leading one of symbols to which the PUSCH is mapped.

<Example of Table of Indices Related to DMRS Configuration Information Pieces>

In the present embodiment, a specific arrangement method is supported when at least one of the parameters of a configuration information piece satisfies a specific condition. In this case, the specific arrangement method is associated with the parameter for the specific condition (specific value) in the DCI notifying the configuration information piece. Next, a description will be given of an example of a table in which the specific arrangement method is associated with the parameter for the specific condition.

Note that, in the following description, condition 1 is a condition that the port number to be assigned to user terminal 20 is port number #0, condition 2 is a condition that the scrambling ID used for code multiplexing of DMRS is scrambling ID #0, and condition 3 is a condition that the number of symbols in which the DMRS is arranged is one.

Note also that, in the following description, the DMRS multiplexing method supported when the condition that the number of ports to be assigned to user terminal 20 is two is satisfied is the CDM in the frequency direction.

FIGS. 13A and 13B illustrate a first example of a table of indices related to DMRS configuration information pieces in the present embodiment. FIG. 14 illustrates a second example of the table of indices related to DMRS configuration information pieces in the present embodiment. FIGS. 13A and 13B and FIG. 14 are the tables of the indices related to the DMRS configuration information pieces corresponding to the first mapping pattern (see FIG. 3).

FIGS. 13A and 13B illustrate the table of indices related to the DMRS configuration information pieces, in which five-bit Indices #0 to #31 related to DMRS configuration information pieces included in the DCI are associated with pieces of information on ports to be assigned to user terminal 20 and with configuration information pieces including the possibility or not of the frequency multiplexing (FDM) between the DMRS and the data signal. Note that, although divided into two figures for convenience of illustration, FIGS. 13A and 13B illustrate one table.

FIG. 14 is the table of indices related to the DMRS configuration information pieces, in which five-bit Indices #0 to #31 related to DMRS configuration information pieces included in the DCI are associated with pieces of information on ports to be assigned to user terminal 20 and with configuration information pieces including the possibility or not of the frequency multiplexing (FDM) between the DMRS and the data signal.

When the number of CWs to be assigned to user terminal 20 by radio base station 10 is one, the DCI including five bits indicating the indices determined with reference to the table of FIGS. 13A and 13B is notified. When the number of CWs to be assigned to user terminal 20 by radio base station 10 is two, the DCI including five bits indicating the indices determined with reference to the table of FIGS. 13A and 13B and five bits indicating the index determined with reference to the table of FIG. 14 is notified to user terminal 20.

Note that, the table illustrated in FIGS. 13A and 13B includes Indices # a to # k for convenience of explanation, which are to be not included in the table of the present embodiment.

For example, as for indices #0 and #1 in FIG. 13A, the associated port number, the associated number of symbols in which the DMRS is arranged, and the associated scrambling ID are #0, 1, and #0, respectively. That is, the information pieces associated with indices #0 and #1 satisfy the aforementioned conditions 1 to 3. Accordingly, index #0 indicating that the DMRS is frequency-multiplexed with the data signal ("enable") and index #1 indicating that the DMRS is not frequency-multiplexed with the data signal ("disable") are provided in the table as different indices.

Similarly, the information pieces associated with indices #5 and #6 satisfy the aforementioned conditions 1 to 3. Accordingly, index #5 indicating that the DMRS is frequency-multiplexed with the data signal and index #6 indicating that the DMRS is not frequency-multiplexed with the data signal ("disable") are provided in the table as different indices.

For example, in a case where the arrangement method in which the DMRS is frequency-multiplexed with the data signal is associated with the configuration information pieces without providing restrictions such as conditions 1 to 3, the number of indices increases and, consequently, the number of bits of the DCI increases and the DCI signaling overhead increases.

For example, the information pieces associated with indices # a to # c and # e do not include port number #0 and, thus, do not satisfy condition 1. That is, when the restriction of condition 1 is not provided, there are increases of indices # a to # c and # e.

Moreover, the information piece associated with index # f includes scrambling ID #1 and, thus, does not satisfy condition 2, for example. That is, when the restriction of condition 2 is not provided, there is an increase of index # f.

Furthermore, in the info nation piece associated with index # g, the number of symbols in which the DMRS is arranged is two and, thus, such an information piece does not satisfy condition 3, for example. That is, when the restriction of condition 3 is not provided, there is an increase of index # g.

In the present embodiment, by providing the restrictions of conditions 1 to 3, the arrangement method in which the DMRS is frequency-multiplexed with the data signal does not need to be associated with those configuration information pieces not satisfying the specific condition, so that it is possible to reduce an increase in the DCI signaling overhead.

Note that, all the restrictions of conditions 1 to 3 do not have to be applied. For example, at least one of the restrictions of conditions 1 to 3 may be applied.

In addition, for example in indices #6 and #7 associated with the information pieces in each of which the condition that the number of ports to be assigned to user terminal 20 is two is satisfied, the set of port numbers to be assigned is a set of port numbers of ports multiplexed by applying the CDM in the frequency direction.

For example, when not providing the restriction that the supported multiplexing method is the CDM in the frequency direction when the condition that the number of ports to be assigned to user terminal 20 is two is satisfied, the number of indices increases, so that the number of bits of DCI increases and the DCI signaling overhead increases.

For example, when no restriction is provided for the supported multiplexing method, there are increases of indices to be associated with the sets of the port numbers of ports for which the FDM is applied, such as indices # d, # h, and # i in FIG. 13A.

In the present embodiment, the restriction of the supported specific multiplexing method is provided with respect to the information pieces satisfying the condition that the number of ports to be assigned to user terminal 20 is two, so that arrangement methods different from the specific multiplexing method do not need to be associated with the configuration information pieces satisfying the condition that the number of ports to be assigned to user terminal 20 is two, and thus, the increase in DCI signaling overhead can be reduced.

Further, index #28 in FIG. 13B is associated with the sets of port numbers different between the case where the CDM in the time direction is supported (TD-OCC On) and the case where the CDM in the time direction is not supported (TD-OCC Off).

When user terminal 20 receives notification of index #28, user terminal 20 determines, based on whether or not the CDM in the time direction is supported, which one of the sets of port numbers (0, 1, 4) and (0, 1, 2) illustrated in FIG. 13B is the port numbers assigned to user terminal 20.

For example, unlike index #28 in FIG. 13B, when the set of port numbers (0, 1, 4) and the set of port numbers (0, 1, 2) are associated with different indices, that is, when indices # j and # k are provided as different indices, the number of indices increases, the number of bits of DCI increases, and the DCI signaling overhead increases.

In the present embodiment, it is possible to reduce an increase in the DCI signaling overhead by providing single index #28 associated with the sets of port numbers different between the case where the CDM in the time direction is supported (TD-OCC On) and the case where the CDM in the time direction is not supported (TD-OCC Off).

FIGS. 15A and 15B illustrate a third example of a table of indices related to DMRS configuration information pieces in the present embodiment. FIG. 16 illustrates a fourth example of the table of indices related to DMRS configuration information pieces in the present embodiment. FIGS. 15A and 15B and FIG. 16 are the tables corresponding to the second mapping pattern (see FIG. 4).

FIGS. 15A and 15B illustrate the table of indices related to the DMRS configuration information pieces, in which six-bit Indices #0 to #63 related to DMRS configuration information pieces included in the DCI are associated with pieces of information on ports to be assigned to user terminal 20 and with configuration information pieces including the possibility or not of the frequency multiplexing (FDM) between the DMRS and the data signal. Note that, although divided into two figures for convenience of illustration, FIGS. 15A and 15B illustrate one table.

FIG. 16 is the table of indices related to the DMRS configuration information pieces, in which six-bit Indices #0 to #63 related to DMRS configuration information pieces included in the DCI are associated with pieces of information on ports to be assigned to user terminal 20 and with configuration information pieces including the possibility or not of the frequency multiplexing (FDM) between the DMRS and the data signal.

When the number of CWs to be assigned to user terminal 20 by radio base station 10 is one, the DCI including six bits indicating the indices determined with reference to the table of FIGS. 15A and 15B is notified to user terminal 20. When the number of CWs to be assigned to user terminal 20 by radio base station 10 is two, the DCI including six bits indicating the indices determined with reference to the table of FIGS. 15A and 15B and six bits indicating the indices determined with reference to the table of FIG. 16 is notified to user terminal 20.

Note that, the tables illustrated in FIGS. 15A and 15B and FIG. 16 include Indices # a to # n for convenience of explanation, which are to be not included in the table of the present embodiment.

The corresponding mapping pattern of FIGS. 15A and 15B and FIG. 16 is different from the corresponding mapping pattern of FIGS. 13A and 13B and FIG. 14. According to FIGS. 15A and 15B and FIG. 16, it is possible to reduce an increase in number of indices, so as to reduce an increase in signaling overhead similarly as described with reference to FIGS. 13A and 13B and FIG. 14.

For example, the information pieces associated with indices # a to # e do not include port number #0 and, thus, do not satisfy condition 1. That is, when the restriction of condition 1 is provided, it is possible to reduce the increases of indices # a to # e.

Moreover, the information piece associated with index # g includes scrambling ID #1 and, thus, does not satisfy condition 2, for example. That is, when the restriction of condition 2 is provided, it is possible to reduce the increase of index # g.

Furthermore, in the information piece associated with index # h, the number of symbols in which the DMRS is arranged is two and, thus, such an information piece does not satisfy condition 3, for example. That is, when the restriction of condition 3 is provided, it is possible to reduce the increase of index # h.

In addition, when the restriction that the supported multiplexing method is the CDM in the frequency direction is provided, for example, it is possible to reduce increases of indices (e.g., indices # f, # i, and # j) associated with the sets of port numbers of ports for which the FDM or the CDM in the time direction is applied.

Further, single indices #40 to #45 are provided, which are associated with the sets of port numbers different between the case where the CDM in the time direction is supported (TD-OCC On) and the case where the CDM in the time direction is not supported (TD-OCC Off). With this configuration, it is not necessary to associate the different sets of port numbers with individual indices as with indices # k to # n, so that it is possible to reduce an increase in DCI signaling overhead.

Note that, the aforementioned tables are tables that reflect all of three associations: the first association is an association between the arrangement methods in which the DMRS is frequency-multiplexed with the data signal and the configuration information pieces satisfying conditions 1 to 3; the second association is an association between the arrangement method using the specific multiplexing method and the configuration information piece satisfying the condition that the number of ports to be assigned to user terminal 20 is two; and the third association is an association in which the sets of port numbers different between the case where the CDM in the time direction is supported and the case where the CDM in the time direction is not supported are associated with single indices in the DCI.

The table in the present invention may also reflect at least one of the three associations without reflecting all of them. Although this causes the DCI overhead to increase, the flexibility of port assignment can be increased.

Note that, the aforementioned tables are examples, and the present invention is not limited to these examples. The correspondences between the indices in the DCI table and the configuration information pieces may be replaced appropriately. Note also that, other information (e.g., information on whether the SU-MIMO or MU-MIMO is applied) may also be included and certain information (e.g., scrambling ID) does not have to be included.

Note also that, port #4 and subsequent ports (i.e., ports #4 to #7) are examples in FIG. 3 as described above, and the indices of these ports may be replaced mutually. Note also that, port #6 and subsequent ports (i.e., ports #6 to #11) are examples in FIG. 4 as described above, and the indices of these ports may be replaced mutually. For example, when the indices of the port numbers are replaced in FIGS. 3 and 4, the port numbers on the aforementioned tables may be replaced according to the replacement of the indices of the port numbers.

<Conclusion>

As described above, in the present embodiment, the configuration is employed in which the specific arrangement method is supported when the information (configuration information pieces) including the information related to the port assigned to user terminal 20 satisfies the predetermined condition. In other words, the restriction that the specific arrangement method is not supported when the configuration information pieces do not satisfy the predetermined condition is provided.

By employing such a configuration, those indices related to DMRS configuration information pieces and associating the specific arrangement method with the configuration information pieces not satisfying the predetermined condition become unnecessary, so that it is possible to reduce an increase in DCI signaling overhead.

<Variation of Condition>

Note that, aforementioned conditions 1 to 3 about the arrangement method in which the DMRS is frequency-multiplexed with the data signal are examples in every respect. The present invention is not limited to these examples. Examples of other conditions may include the number of ports to be assigned to user terminal 20. Hereinafter, this condition is described as condition 4.

<Condition 4>

That is, in condition 4, when the number of ports to be assigned to user terminal 20 is a specific number of ports, the arrangement method in which the DMRS is frequency-multiplexed with the data signal is supported. In other words, when the number of ports to be assigned to user terminal 20 is not the specific number of ports, the arrangement method in which the DMRS is frequency-multiplexed with the data signal is not supported.

Figure 18:
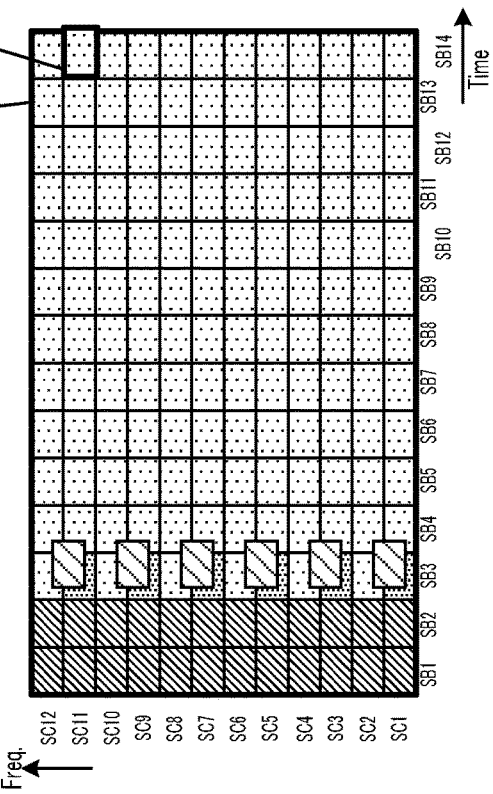
FIG. 18 illustrates seventh examples of an arrangement method in one embodiment of the present invention.

FIG. 17 illustrates sixth examples of an arrangement method in the present embodiment. FIG. 18 illustrates seventh examples of an arrangement method in the present embodiment.

FIGS. 17 and 18 illustrate the examples of arrangement of the DMRS and the data signal to be supported when the number of assigned ports is one which is the specific number of ports in condition 4.

As illustrated in FIG. 17, when the number of ports assigned to user terminal 20 is one, arrangement method f-1 in which the DMRS is frequency-multiplexed with the data signal and arrangement method f-2 in which the DMRS is not frequency-multiplexed with the data signal are both supported. That is, when the number of ports assigned to user terminal 20 is one, the arrangement method in which the DMRS is frequency-multiplexed with the data signal is accepted.

On the other hand, as illustrated in FIG. 18, when the number of ports assigned to user terminal 20 is two, arrangement method g-1 in which the DMRS is frequency-multiplexed with the data signal is not supported, but arrangement method g-2 in which the DMRS is not frequency-multiplexed with the data signal is supported.

Note that, when the number of ports assigned to user terminal 20 is one, radio base station 10 may determine which of the two supported arrangement methods to select.

For example, radio base station 10 may select one of the two supported arrangement methods based on the downlink channel quality (e.g., SNR and/or CQI) notified by user terminal 20, or based on the uplink channel quality measured by radio base station 10 using a reference signal transmitted from user terminal 20. In particular, radio base station 10 may select arrangement method f-1 when the channel quality is equal to or greater than a predetermined value or select arrangement method f-2 when the channel quality is less than the predetermined value, and, radio base station 10 may perform scheduling of arrangement of the downlink signal in accordance with the selected arrangement method.

Alternatively, radio base station 10 may select one of the two supported arrangement methods based on whether the SU-MIMO or MU-MIMO is applied. To be more specific, radio base station 10 may select arrangement method f-1 when the SU-MIMO is applied or select arrangement method f-2 when the MU-MIMO is applied, and radio base station 10 may perform the scheduling of arrangement of the downlink signal in accordance with the selected arrangement method.

Note that, in arrangement methods f-2 and g-2, there are REs on which no signal other than the DMRS is arranged in the symbol in which the DMRS is arranged. In this case, user terminal 20 may be notified implicitly or explicitly of whether or not boosting was performed and/or of the magnitude of the boosted transmit power.

<Variation 1 of Association in DCI>

Note that, other parameters may also be associated with the indices related to the DMRS configuration information pieces included in the DCI described above. For example, information on the modulation scheme (e.g., MCS and/or Transport Block Size (TBS)) may be associated with each of the indices related to the DMRS configuration information pieces included in the DCI. In this case, for example, the port number assigned to user terminal 20 may be changed depending on the information related to the modulation scheme even when the index is the same. User terminal 20 identifies the port number assigned to user terminal 20 and the DMRS arrangement method for the assigned port number based on the notified index and information on the modulation scheme.

Hereinbelow, a description will be give of an example of association between the information on the modulation scheme and the DMRS arrangement method.

For example, when the TBS or TBS index corresponding to a modulation scheme having a relatively higher modulation order (e.g., 16 Quadrature Amplitude Modulation (QAM), 64QAM, or 256QAM) is notified, the arrangement method in which the DMRS is frequency-multiplexed with the data signal is supported. When the TBS or TBS index corresponding to a modulation scheme having a relatively lower modulation order (e.g., ½pi Binary Phase Shift Keying (BPSK) or Quadrature Phase Shift Keying (QPSK)) is notified, the arrangement method in which the DMRS is frequency-multiplexed with the data signal is not supported. That is, the TBS satisfying the condition that the modulation order is equal to or higher than a predetermined order is associated with the arrangement method in which the DMRS is frequency-multiplexed with the data signal In addition, when the TBS or TBS index corresponding to the modulation scheme having a relatively higher modulation order (e.g., 16QAM, 64QAM, or 256QAM) is notified, the arrangement method in which the FDM is applied as the arrangement method of DMRSs of two ports is supported. When the TBS or TBS index corresponding to the modulation scheme having a relatively lower modulation order (e.g., ½pi BPSK or QPSK) is notified, the arrangement method in which the CDM in the frequency direction is applied as the arrangement method of DMRSs of two ports is supported. That is, the TBS or TBS index satisfying the condition that the modulation order is equal to or higher than a predetermined order is associated with the arrangement method of DMRSs of two ports in which the FDM is applied, and the TBS or TBS index satisfying the condition that the modulation order is lower than a predetermined order is associated with the arrangement method of DMRSs of two ports in which the CDM in the frequency direction is applied.

Note that, higher layer and/or broadcast information may be used to notify whether or not the supported arrangement method is switched depending on the modulation order and/or the threshold of the modulation order at which the supported arrangement method is switched.

<Variation 2 of Association in DCI>

Note that, while the specific arrangement method is associated with the specific configuration information pieces in the aforementioned tables, other associations may be included in the tables. For example, a specific scrambling ID may be associated with a specific parameter (e.g., port number) of a configuration information piece. By way of an example, the scrambling ID may be associated with scrambling ID #0 when the port number includes port #0, and the scrambling ID is not associated with scrambling ID #0 when the port number does not include port #0.

The embodiments of the invention have been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 19:
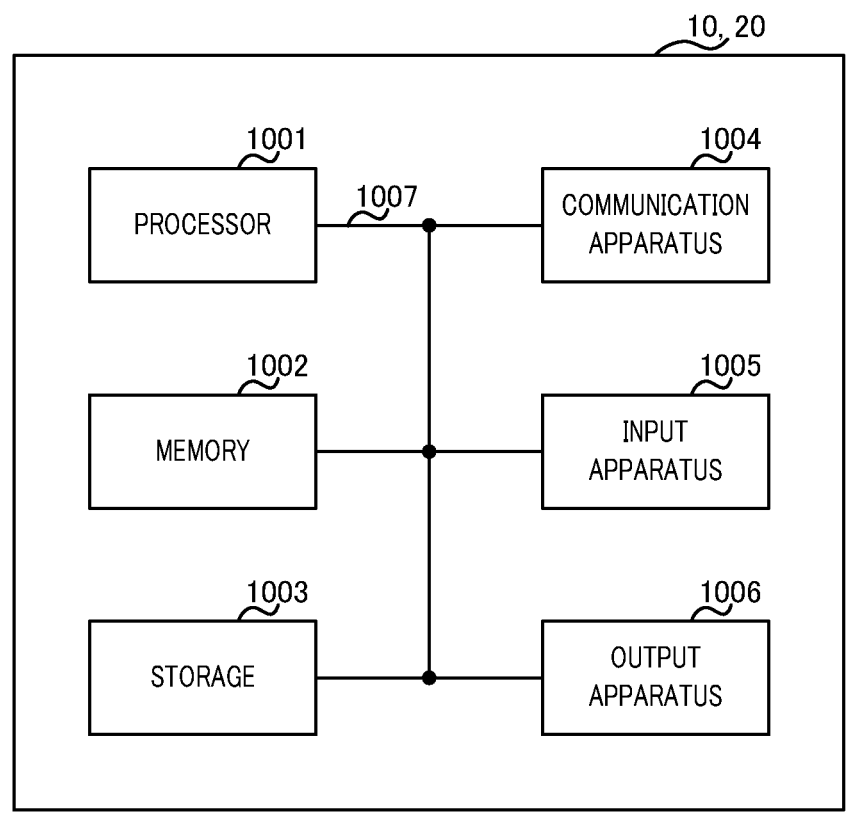
FIG. 19 illustrates an example of hardware configuration of the radio base station and the user terminal according to one embodiment of the present invention.

For example, radio base station 10, user terminal 20, and the like according to an embodiment of the present invention may function as a computer that executes processing of a radio communication method of the present invention. FIG. 19 illustrates an example of a hardware configuration of radio base station 10 and user terminal 20 according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, transmission signal generators 102 and 206, encoder and modulators 103 and 207, mappers 104 and 208, controllers 108 and 203, channel estimators 109 and 204, demodulator and decoder 110 and 205, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitter 105 and 209, antennas 106 and 201, receiver 107 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" may be interchangeably used in the present specification. The base station may be called a fixed station, a NodeB, an eNodeB (eNB), a gNodeB (gNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. In addition, the DMRS may be call by other corresponding names, e.g., demodulation RS, DM-RS, and the like.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The tennis "including," "comprising," and modifications of these terms are intended to be inclusive just like the term "having," as long as the tennis are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot may be called a TTI, or one mini slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

[Additional Note]
[Additional Note 1]

A user terminal, including:

a receiver that receives control information indicating one of possible combination patterns of a plurality of parameters related to arrangement of a demodulation reference signal on a radio resource; and a controller that controls reception processing of a downlink signal transmitted by a radio base station, the controller controlling the reception processing based on information indicating one of a plurality of multiplexing methods of the demodulation reference signal and based on the control information, the information indicating the one of the plurality of multiplexing methods by one of the combination patterns in which at least one of the plurality of parameters is configured to a specific value.

[Additional Note 2]

The user terminal according to additional note 1, in which the at least one of the plurality of parameters is a number of ports assigned to the user terminal according to additional note 1, and the one of the plurality of multiplexing methods of the demodulation reference signal is indicated by the number of ports being configured to the specific value.

[Additional Note 3]

A user terminal, including:

a receiver that receives control information indicating one of possible combination patterns of a plurality of parameters related to arrangement of a demodulation reference signal on a radio resource; and a controller that controls reception processing of a downlink signal transmitted by a radio base station, the controller controlling the reception processing based on information of at least one of the possible combination patterns and based on the control information, the information of the at least one of the possible combination patterns including a parameter indicating a first set of port numbers of ports for which a multiplexing method is applied and a parameter indicating a second set of port numbers of ports for which the multiplexing method is not applied.

INDUSTRIAL APPLICABILITY

An aspect of the present invention is useful for a mobile communication system.

REFERENCE SIGNS LIST

10 Radio base station
20 User terminal
101 Scheduler
102, 206 Transmission signal generator
103, 207 Encoder and modulator
104, 208 Mapper
105, 209 Transmitter 106, 201 Antenna
107, 202 Receiver
108, 203 Controller
109, 204 Channel estimator
110, 205 Demodulator and decoder

The invention claimed is:

1. A terminal, comprising:
a receiver that receives a demodulation reference signal; and
a processor that controls reception of the demodulation reference signal based on a parameter related to mapping of the demodulation reference signal,
wherein when the parameter is configured to a specific value, a specific multiplexing method for the demodulation reference signal is supported,
wherein the parameter is at least one of a port number of the demodulation reference signal and a number of symbols to which the demodulation reference signal is mapped, and
wherein the parameter is determined based on a relationship between an index for specifying the parameter and a number of codewords.

2. The terminal according to claim 1, wherein
when the parameter is configured to the specific value, frequency multiplexing between the demodulation reference signal and a data signal is supported.

3. The terminal according to claim 1, wherein
power of the demodulation reference signal in a case where frequency multiplexing between the demodulation reference signal and a data signal is not supported is greater than power of the demodulation reference signal in a case where the frequency multiplexing between the demodulation reference signal and the data signal is supported.

4. A terminal, comprising:
a receiver that receives a demodulation reference signal; and
a processor that controls reception of the demodulation reference signal based on a parameter related to mapping of the demodulation reference signal,
wherein when the parameter is configured to a specific value, a second multiplexing method between the demodulation reference signal and a data signal is supported,
wherein the parameter is a port number of the demodulation reference signal, and
wherein when the port number of the demodulation reference signal is configured to the specific value, the second multiplexing method between the demodulation reference signal and the data signal is supported, the second multiplexing method being other than a frequency multiplexing method between the demodulation reference signal and the data signal.

5. A terminal, comprising:
a receiver that receives a demodulation reference signal; and
a processor that controls reception of the demodulation reference signal based on a parameter related to mapping of the demodulation reference signal, wherein
when the parameter is configured to a specific value, a specific multiplexing method for the demodulation reference signal is supported, and
when a number of ports for the demodulation reference signal is configured to 2 and a number of symbols to which the demodulation reference signal is mapped is configured to 2, multiplexing between a plurality of the demodulation reference signals by code division multiplexing method in frequency direction is supported.

6. A radio communication system, comprising:
a base station including:
a transmitter that transmits a demodulation reference signal, and a terminal including:
a receiver that receives the demodulation reference signal; and
a processor that controls reception of the demodulation reference signal based on a parameter related to mapping of the demodulation reference signal,
wherein when the parameter is configured to a specific value, a specific multiplexing method for the demodulation reference signal is supported,
wherein the parameter is at least one of a port number of the demodulation reference signal and a number of symbols to which the demodulation reference signal is mapped, and
wherein the parameter is determined based on a relationship between an index for specifying the parameter and a number of codewords.

7. A radio communication method, comprising:
receiving a demodulation reference signal; and
controlling reception of the demodulation reference signal based on a parameter related to mapping of the demodulation reference signal, wherein when the parameter is configured to a specific value, a specific multiplexing method for the demodulation reference signal is supported,
wherein the parameter is at least one of a port number of the demodulation reference signal and a number of symbols to which the demodulation reference signal is mapped, and
wherein the parameter is determined based on a relationship between an index for specifying the parameter and a number of codewords.

* * * * *